United States Patent
Jiang et al.

(10) Patent No.: US 11,360,183 B2
(45) Date of Patent: *Jun. 14, 2022

(54) TERMINAL POSITIONING METHOD AND BASEBAND UNIT

(71) Applicant: HUAWEI TECHNOLOGIES CO., LTD., Guangdong (CN)

(72) Inventors: Yanping Jiang, Shenzhen (CN); Yongjun Liu, Beijing (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,039

(22) Filed: May 4, 2020

(65) Prior Publication Data

US 2020/0264263 A1 Aug. 20, 2020

Related U.S. Application Data

(63) Continuation of application No. 15/920,688, filed on Mar. 14, 2018, now Pat. No. 10,677,884, which is a
(Continued)

(30) Foreign Application Priority Data

Dec. 4, 2015 (CN) .......................... 201510883925.X

(51) Int. Cl.
*H04W 28/02* (2009.01)
*G01S 5/04* (2006.01)
(Continued)

(52) U.S. Cl.
CPC ............... *G01S 5/04* (2013.01); *H04W 4/023* (2013.01); *H04W 4/33* (2018.02);
(Continued)

(58) Field of Classification Search
CPC ..... H04B 17/12; H04B 7/022; H04L 25/0204; G01S 5/04; H04W 28/0221;
(Continued)

(56) References Cited

U.S. PATENT DOCUMENTS

2007/0042706 A1 2/2007 Ledeczi et al.
2008/0186869 A1 8/2008 Jeon et al.
(Continued)

FOREIGN PATENT DOCUMENTS

CN 101389118 A 3/2009
CN 101776746 A 7/2010
(Continued)

OTHER PUBLICATIONS

Communication Pursuant to Article 94 (3) EPC issued in European Application No. 16869687.0 dated Jun. 2, 2020, 4 pages.
(Continued)

*Primary Examiner* — Vinncelas Louis
(74) *Attorney, Agent, or Firm* — Fish & Richardson P.C.

(57) ABSTRACT

The present disclosure describes methods, terminals, and base stations for terminal positioning method. One example method applied to a baseband unit (BBU) in an indoor distributed NodeB system includes: receiving an uplink positioning signal forwarded by multiple remote radio units RRUs, where the uplink positioning signal is sent by a to-be-positioned terminal to the multiple RRUs; selecting, from the multiple RRUs, at least two RRUs as target RRUs according to the uplink positioning signal and a preset rule; and respectively obtaining signal angles of arrival corresponding to the target RRUs, and determining a location of the to-be-positioned terminal according to the signal angles of arrival, locations of the target RRUs, and a preset algorithm.

8 Claims, 9 Drawing Sheets

Related U.S. Application Data continuation of application No. PCT/CN2016/091571, filed on Jul. 25, 2016.

(51) Int. Cl.
  *H04W 4/33* (2018.01)
  *H04W 4/02* (2018.01)
  *H04W 64/00* (2009.01)
  *H04W 52/02* (2009.01)

(52) U.S. Cl.
  CPC ... *H04W 28/0221* (2013.01); *H04W 52/0212* (2013.01); *H04W 64/003* (2013.01); *H04W 28/0226* (2013.01); *Y02D 30/70* (2020.08)

(58) Field of Classification Search
  CPC .......... H04W 64/003; H04W 52/0212; H04W 4/023; H04W 4/33; H04W 28/0226; Y02D 70/1262; Y02D 70/164; Y02D 70/00
  See application file for complete search history.

(56) References Cited

U.S. PATENT DOCUMENTS

| | | | |
|---|---|---|---|
| 2008/0192855 | A1 | 8/2008 | Shapira et al. |
| 2012/0015669 | A1 | 1/2012 | Qin et al. |
| 2013/0023278 | A1 | 1/2013 | Chin |
| 2013/0023285 | A1 | 1/2013 | Markhovsky et al. |
| 2013/0051317 | A1 | 2/2013 | Ji et al. |
| 2013/0343332 | A1 | 12/2013 | Yao |
| 2014/0120947 | A1 | 5/2014 | Siomina |
| 2014/0321582 | A1 | 10/2014 | Cheng et al. |
| 2015/0003301 | A1 | 1/2015 | He et al. |
| 2015/0268326 | A1 | 9/2015 | Sung et al. |
| 2016/0345286 | A1 | 11/2016 | Jamieson et al. |

FOREIGN PATENT DOCUMENTS

| | | |
|---|---|---|
| CN | 101808359 A | 8/2010 |
| CN | 102256350 A | 11/2011 |
| CN | 102664669 A | 9/2012 |
| CN | 102749613 A | 10/2012 |
| CN | 102998654 A | 3/2013 |
| CN | 103096460 A | 5/2013 |
| CN | 103404213 A | 11/2013 |
| CN | 103513228 A | 1/2014 |
| CN | 103514638 A | 1/2014 |
| CN | 104540221 A | 4/2015 |
| CN | 104812061 A | 7/2015 |
| CN | 105007623 A | 10/2015 |
| EP | 1380184 B1 | 1/2007 |
| EP | 1166145 B1 | 8/2008 |
| EP | 2282574 A2 | 2/2011 |
| WO | 2005045455 A2 | 5/2005 |
| WO | 2010122370 A1 | 10/2010 |
| WO | 2010145251 A1 | 12/2010 |
| WO | 2014053877 A1 | 4/2014 |
| WO | 2014060777 A2 | 4/2014 |
| WO | 2014064656 A2 | 5/2014 |
| WO | 2015114313 A1 | 8/2015 |
| WO | 2015114355 A1 | 8/2015 |
| WO | 2016045386 A1 | 3/2016 |

OTHER PUBLICATIONS

3GPP TR 36.855 V13.0.0 (Jan. 2015), 3rd Generation Partnership Project;Technical Specification Group Radio Access Network; Feasibility of positioning enhancements for E-UTRA(Release 13),Technical Report, 52 pages.

Extended European Search Report issued in European Application No. 16869687.0 dated May 18, 2018, 7 pages.

International Search Report in International Application No. PCT/CN2016/091571 dated Oct. 26, 2016, 14 pages.

Office Action issued in Chinese Application No. 201510883925.X dated Nov. 6, 2019, 4 pages.

EPO Communication under Rule 71(3) EPC issued in European Application No. 16869687.0 dated Jan. 26, 2022, 58 pages.

TERMINAL POSITIONING METHOD AND BASEBAND UNIT

CROSS-REFERENCE TO RELATED APPLICATIONS

This application is a continuation of U.S. patent application Ser. No. 15/920,688, filed on Mar. 14, 2018, which is a continuation of International Application No. PCT/CN2016/091571, filed on Jul. 25, 2016. The International Application claims priority to Chinese Patent Application No. 201510883925.X, filed on Dec. 4, 2015. All of the aforementioned patent applications are hereby incorporated by reference in their entireties.

TECHNICAL FIELD

Embodiments of the present invention relate to the communications field, and in particular, to a terminal positioning method and a baseband unit.

BACKGROUND

With development of mobile communications, the demand for positioning services is rapidly increasing. The Global Positioning System (GPS) has been widely used outdoors with very high precision, improving user experience. Related studies have shown that 80% of data application is implemented indoors. However, in most cases, no GPS signal can arrive in an indoor environment, and an indoor positioning requirement cannot be met if GPS is still used for positioning.

Currently, a method for indoor positioning is to perform indoor positioning by using an indoor distributed NodeB system (iDBS). Based on iDBS positioning, there are mainly the following two methods:

First: Positioning is performed on a terminal side. A terminal performs positioning based on downlink signals received from multiple remote radio units (RRU). The RRUs send positioning reference signals (PRS) at specific intervals, and different RRUs send different PRSs, or different identifiers are allocated to different RRUs, so as to position the terminal. This can avoid confusion between the RRUs.

Second: Positioning is performed on a network side. A baseband unit (BBU) performs positioning based on uplink signals received by RRUs from a terminal. The BBU determines, according to whether an RRU first receives the signal from the terminal, whether the RRU is closest to the terminal, and uses the closest RRU to measure a round trip time RTT) used to reach the terminal. The BBU selects at least three RRUs, and may calculate a location of the terminal according to distances from the three RRUs to the to-be-positioned terminal.

However, both of the foregoing two methods in the prior art have disadvantages. In the positioning method on the terminal side, power consumption of the terminal is increased because calculation is performed on the terminal side. In addition, when there are a relatively large quantity of RRUs, sending PRSs at intervals leads to a relatively long positioning measurement period, affecting normal data communication efficiency. Because different RRUs are distinguished by using different identifiers, an existing cellular communication protocol needs to be correspondingly modified, resulting in poor compatibility of the solution.

In the positioning method on the network side, the BBU can obtain time information only after a communication round trip, invisibly increasing network load. In a dense scenario, a large quantity of positioning signals are exchanged, interrupting a normal data service.

SUMMARY

Embodiments of the present invention provide a terminal positioning method and a baseband unit. Therefore, target RRUs for positioning can be directly selected in an existing indoor coverage system according to an uplink positioning signal, reducing costs and time. In addition, positioning calculation is performed on a network side, reducing power consumption of a terminal, and calculation can be performed after performing communication only once, greatly reducing network load.

In view of this, a first aspect of the present invention provides a terminal positioning method. The method is applied to a baseband unit BBU in an indoor distributed NodeB system, and the method includes:
  receiving, by the BBU, an uplink positioning signal forwarded by multiple remote radio units RRUs, where the uplink positioning signal is sent by a to-be-positioned terminal to the multiple RRUs;
  selecting, by the BBU from the multiple RRUs, at least two RRUs as target RRUs according to the uplink positioning signal and a preset rule; and
  respectively obtaining, by the BBU, signal angles of arrival corresponding to the target RRUs, and determining a location of the to-be-positioned terminal according to the signal angles of arrival, locations of the target RRUs, and a preset algorithm.

In the embodiments of the present invention, the BBU receives the uplink positioning signal sent by the multiple remote radio units RRUs; selects, from the multiple RRUs, the at least two RRUs as the target RRUs according to the uplink positioning signal and the preset rule; and respectively calculates the signal angles of arrival corresponding to the target RRUs, and determines the location of the to-be-positioned terminal according to the signal angles of arrival. It can be learned from the foregoing method that, the BBU selects target RRUs for positioning in an existing indoor coverage system according to the uplink positioning signal, reducing costs and time. In addition, according to the solution, positioning calculation is performed on a network side, reducing power consumption of a terminal, and calculation can be performed after performing communication only once, greatly reducing network load.

With reference to the first aspect of the embodiments of the present invention, in a first possible implementation, before the selecting, from the multiple RRUs, at least two RRUs as target RRUs according to the uplink positioning signal and a preset rule, the method may further include:
  obtaining a physical distance between every two of the at least two RRUs; and
  the selecting, from the multiple RRUs, at least two RRUs as target RRUs according to the uplink positioning signal and a preset rule may include:
  separately obtaining, according to the uplink positioning signal, a signal strength of the uplink positioning signal received by each of the multiple RRUs; and
  determining the at least two RRUs as the target RRUs when the physical distance between every two of the at least two RRUs is greater than a first preset value and a signal strength of the uplink positioning signal received by each of the at least two RRUs is greater than a second preset value.

Then, in the embodiments of the present invention, a method for selecting the target RRUs is provided. The physical distance between every two of the at least two RRUs of the multiple RRUs is obtained, and the signal strength of the uplink positioning signal received by the multiple RRUs are obtained according to the uplink positioning signal, so as to separately determine whether the physical distance between every two RRUs is greater than the first preset value and whether the signal strengths of the at least two RRUs of the multiple RRUs are greater than the second preset value. The at least two RRUs can be used as the target RRUs only when the at least two RRUs meet both of the foregoing two preset conditions. The BBU selects the RRUs according to the physical distance and the signal strengths, which can increase feasibility of the solution and help select more suitable RRUs as the target RRUs for calculating the signal angles of arrival. Therefore, a calculation result is closer to an actual value, thereby improving precision of the solution.

With reference to the first aspect of the embodiments of the present invention, in a second possible implementation, the selecting, from the multiple RRUs, at least two RRUs as target RRUs according to the uplink positioning signal and a preset rule may include:

obtaining channel state information of a channel from the to-be-positioned terminal to the multiple RRUs according to the uplink positioning signal; and when it is calculated, according to the channel state information, that a channel correlation coefficient between CSI of every two of the at least two RRUs is less than a third preset value, using the at least two RRUs that have the CSI between which the channel correlation coefficient is less than the third preset value as the target RRUs.

Then, in the embodiments of the present invention, another method for selecting the target RRUs is provided. The BBU obtains the channel state information of the channel from the to-be-positioned terminal to the multiple RRUs according to the uplink positioning signal; and when it is calculated, according to the channel state information, that the channel correlation coefficient between the CSI of every two of the at least two RRUs is less than the third preset value, uses the at least two RRUs that have the CSI between which the channel correlation coefficient is less than the third preset value as the target RRUs. The BBU selects the RRUs according to the channel correlation coefficient, which can further increase feasibility and flexibility of the solution.

With reference to the first aspect of the embodiments of the present invention, in a third possible implementation, before the selecting, from the multiple RRUs, at least two RRUs as target RRUs according to the uplink positioning signal and a preset rule, the method may further include:

obtaining a physical distance between every two of the at least two RRUs; and the selecting, from the multiple RRUs, at least two RRUs as target RRUs according to the uplink positioning signal and a preset rule may include:

separately obtaining, according to the uplink positioning signal, a signal strength of the uplink positioning signal received by each of the multiple RRUs and channel state information of a channel from the to-be-positioned terminal to the multiple RRUs; and determining the at least two RRUs as the target RRUs when the physical distance between every two of the at least two RRUs is greater than a first preset value, a signal strength of the uplink positioning signal received by each of the at least two RRUs is greater than a second preset value, and it is calculated, according to the channel state information, that a channel correlation coefficient between CSI of every two of the at least two RRUs is less than a third preset value.

Then, in the embodiments of the present invention, still another method for selecting the target RRUs is provided. The physical distance between every two of the at least two RRUs of the multiple RRUs is obtained, the signal strengths of the multiple RRUs are determined according to the uplink positioning signal, and the channel state information of the channel from the to-be-positioned terminal to the multiple RRUs is obtained, so as to separately determine whether the foregoing three conditions are met, and determine an RRU meeting all of the three conditions as a target RRU. Therefore, the RRUs are selected, which can further increase feasibility of the solution. In addition, more accurate signal angles of arrival can be obtained by using the target RRU meeting all of the three conditions as the basis for calculating the signal angles of arrival, so that a more accurate location of the terminal can be determined.

With reference to the first aspect of the embodiments of the present invention, in a fourth possible implementation, the respectively obtaining signal angles of arrival corresponding to the target RRUs, and determining a location of the to-be-positioned terminal according to the signal angles of arrival, locations of the target RRUs, and a preset algorithm may include:

calculating the signal angles of arrival corresponding to the target RRUs according to the following manner:

$\alpha = ar\cos((\lambda\theta)/(2\pi d))$, where $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and calculating the location of the to-be-positioned terminal according to the at least two calculated signal angles of arrival, the locations of the target RRUs, and the preset algorithm.

Then, in the embodiments of the present invention, a method for calculating the signal angles of arrival corresponding to the target RRUs is provided. Indoor positioning is performed on the network side based on the signal angles of arrival, reducing power consumption of the terminal. In addition, in this process, the algorithm has low communication overheads. The BBU can process signals received by two RRUs together. Alternatively, when multiple RRUs are used as the target RRUs to position the terminal, because multiple signal angles of arrival can be obtained according to the multiple RRUs, a range is obtained when the location of the terminal is calculated, so as to determine the location of the terminal in the range. When there are multiple estimated locations, exclusion and refinement are performed on results to increase positioning precision, improving efficiency of the solution during actual application, and enhancing practicability and operability of the solution.

Optionally, the respectively obtaining signal angles of arrival corresponding to the target RRUs, and determining a location of the to-be-positioned terminal according to the signal angles of arrival, locations of the target RRUs, and a preset algorithm may include:

when there are two target RRUs, calculating two signal angles of arrival corresponding to the two RRUs; and calculating a first location of the to-be-positioned terminal according to the two signal angles of arrival and locations of the target RRUs.

Still, in the embodiments of the present invention, a method for performing indoor positioning on the network side based on the signal angles of arrival when there are two target RRUs is provided, reducing power consumption of the terminal. In addition, in this process, the algorithm has low communication overheads, and positioning precision is relatively high. The BBU can process signals received by two RRUs together, with no need to perform synchronization and information exchange between multiple base stations that is performed in a conventional cellular system, improving efficiency of the solution during actual application, and enhancing practicability and operability of the solution.

Optionally, the respectively obtaining signal angles of arrival corresponding to the target RRUs, and determining a location of the to-be-positioned terminal according to the signal angles of arrival, locations of the target RRUs, and a preset algorithm may include:
  when there are more than two target RRUs, calculating more than two signal angles of arrival corresponding to the more than two RRUs; and
  calculating a second location of the to-be-positioned terminal according to the more than two signal angles of arrival and locations of the target RRUs.

Still, in the embodiments of the present invention, a method for performing indoor positioning on the network side based on the signal angles of arrival when there are multiple target RRUs is provided, reducing power consumption of the terminal. In addition, in this process, the algorithm has low communication overheads. When multiple RRUs are used as the target RRUs to position the terminal, because multiple signal angles of arrival can be obtained according to the multiple RRUs, a range is obtained when the location of the terminal is calculated, so as to determine the location of the terminal in the range. When there are multiple estimated locations, exclusion and refinement are performed on results to increase positioning precision, improving efficiency of the solution during actual application, and enhancing practicability and operability of the solution.

A second aspect of the present invention provides a baseband unit. The baseband unit is applied to an indoor distributed NodeB system, and the baseband unit may include:
  a receiving module, configured to receive an uplink positioning signal forwarded by multiple remote radio units RRUs, where the uplink positioning signal is sent by a to-be-positioned terminal to the multiple RRUs;
  a selection module, configured to select, from the multiple RRUs, at least two RRUs as target RRUs according to the uplink positioning signal received by the receiving module and a preset rule; and
  a calculation module, configured to: respectively obtain signal angles of arrival corresponding to the target RRUs selected by the selection module, and determine a location of the to-be-positioned terminal according to the signal angles of arrival, locations of the target RRUs, and a preset algorithm.

With reference to the second aspect in the embodiments of the present invention, in a first possible implementation, the baseband unit includes:
  a first obtaining module, configured to obtain a physical distance between every two of the at least two RRUs before the selection module selects, from the multiple RRUs, the at least two RRUs as the target RRUs according to the uplink positioning signal and the preset rule; and
  the selection module includes:
  a first obtaining unit, configured to separately obtain, according to the uplink positioning signal, a signal strength of the uplink positioning signal received by each of the multiple RRUs; and
  a first determining unit, configured to determine the at least two RRUs as the target RRUs when the physical distance that is between every two of the at least two RRUs and that is obtained by the first obtaining module is greater than a first preset value, and a signal strength that is of the uplink positioning signal received by each of the at least two RRUs and that is obtained by the first obtaining unit is greater than a second preset value.

With reference to the second aspect in the embodiments of the present invention, in a second possible implementation, the selection module includes:
  a second obtaining unit, configured to obtain channel state information of a channel from the to-be-positioned terminal to the multiple RRUs according to the uplink positioning signal; and
  a second determining unit, configured to: when it is calculated, according to the channel state information obtained by the second obtaining unit, that a channel correlation coefficient between CSI of every two of the at least two RRUs is less than a third preset value, use the at least two RRUs that have the CSI between which the channel correlation coefficient is less than the third preset value as the target RRUs.

With reference to the second aspect in the embodiments of the present invention, in a third possible implementation, the baseband unit includes:
  a second obtaining module, configured to obtain a physical distance between every two of the at least two RRUs before the selection module selects, from the multiple RRUs, the at least two RRUs as the target RRUs according to the uplink positioning signal and the preset rule; and
  the selection module includes:
  a third obtaining unit, configured to separately obtain, according to the uplink positioning signal, a signal strength of the uplink positioning signal received by each of the multiple RRUs and channel state information of a channel from the to-be-positioned terminal to the multiple RRUs; and
  a third determining unit, configured to determine the at least two RRUs as the target RRUs when the physical distance that is between every two of the at least two RRUs and that is obtained by the second obtaining module is greater than a first preset value, a signal strength that is of the uplink positioning signal received by each of the at least two RRUs and that is obtained by the third obtaining unit is greater than a second preset value, and it is calculated, according to the channel state information, that a channel correlation coefficient between CSI of every two of the at least two RRUs is less than a third preset value.

With reference to the second aspect in the embodiments of the present invention, in a fourth possible implementation, the calculation module includes:
  a first calculation unit, configured to calculate the signal angles of arrival corresponding to the target RRUs according to the following manner:

α=ar cos((λθ)/(2πd)), where α represents the signal angles of arrival corresponding to the target RRUs, λ represents a wavelength of a radio signal, θ represents a phase difference between signals received by adjacent antenna array elements, d represents a distance between the antenna array elements, and π is a circumference ratio; and a second calculation unit, configured to calculate the location of the to-be-positioned terminal according to the at least two signal angles of arrival calculated by the first calculation unit, the locations of the target RRUs, and the preset algorithm.

A third aspect of the present invention provides a baseband unit, including a memory, a transceiver, a processor, and a bus system, where the memory is configured to store a program;

the processor is configured to execute the program in the memory, to specifically perform the following steps:

controlling the transceiver to receive an uplink positioning signal forwarded by multiple remote radio units RRUs, where the uplink positioning signal is sent by a to-be-positioned terminal to the multiple RRUs;

selecting, from the multiple RRUs, at least two RRUs as target RRUs according to the uplink positioning signal and a preset rule; and respectively obtaining signal angles of arrival corresponding to the target RRUs, and determining a location of the to-be-positioned terminal according to the signal angles of arrival, locations of the target RRUs, and a preset algorithm; and the bus system is configured to connect the memory, the transceiver, and the processor, so that the memory, the transceiver, and the processor communicate with each other.

It can be learned from the foregoing technical solutions that the embodiments of the present invention have the following advantages:

In the embodiments of the present invention, the BBU receives the uplink positioning signal sent by the multiple remote radio units RRUs; selects, from the multiple RRUs, the at least two RRUs as the target RRUs according to the uplink positioning signal and the preset rule; and respectively calculates the signal angles of arrival corresponding to the target RRUs, and determines the location of the to-be-positioned terminal according to the signal angles of arrival. It can be learned from the foregoing method that, the BBU selects target RRUs for positioning in an existing indoor coverage system according to the uplink positioning signal, reducing costs and time. In addition, according to the solutions, positioning calculation is performed on a network side, reducing power consumption of a terminal, and calculation can be performed after performing communication only once, greatly reducing network load.

DESCRIPTION OF EMBODIMENTS

Figure 1:
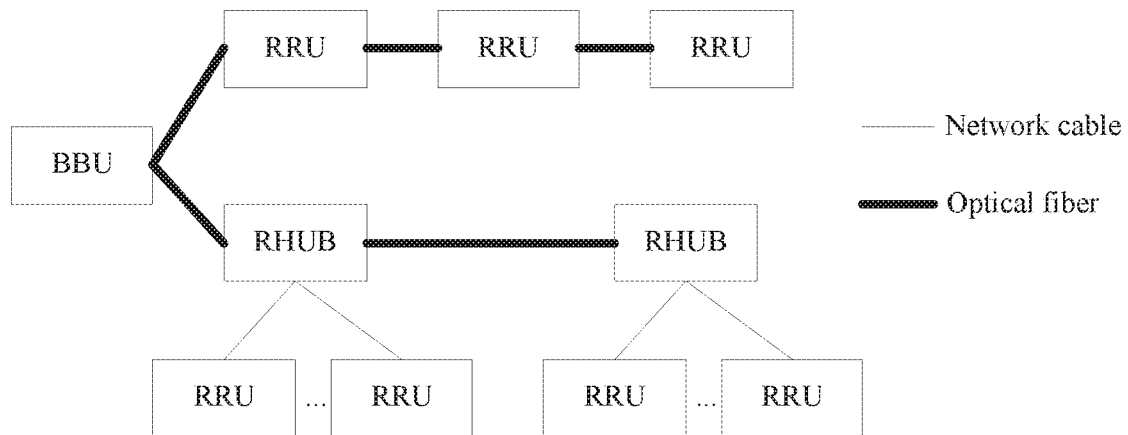
FIG. 1 is a schematic diagram of networking of an indoor distributed NodeB system according to an embodiment of the present invention.

Embodiments of the present invention provide a terminal positioning method, a related device, and a system. Therefore, target RRUs for positioning can be directly selected in an existing indoor coverage system according to an uplink positioning signal, reducing costs and time. In addition, positioning calculation is performed on a network side, reducing power consumption of a terminal, and calculation can be performed after performing communication only once, greatly reducing network load.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented, for example, in orders except the order illustrated or described herein. Moreover, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

In the specification, claims, and accompanying drawings of the present invention, the mentioned "greater than" or "less than" is intended to demarcate a preset range. The case of "being equal to" may be attributed to "greater than" or may be attributed to "less than". A specific setting rule can be determined according to a requirement of a user, and therefore is not limited herein.

It should be understood that the embodiments are applied to an indoor distributed NodeB system (English full name: indoor Distributed NodeB System, iDBS for short), and indoor positioning is performed in the iDBS. The iDBS uses intelligent processing technologies and design ideas such as a digital technology, a distributed base station technology, a central processing unit (English full name: Central Processing Unit, CPU for short), and digital signal processing (English full name: digital signal processing, DSP for short). The iDBS is a solution of indoor coverage of a cellular network signal, and a positioning function is added based on an existing indoor coverage system, thereby reducing positioning costs. Applying the solutions of the present invention to the iDBS can better present advantages of the iDBS, and the system does not need to be redeployed for a positioning function. It can be understood that the solutions can also be implemented by adding another positioning function in other communications networks. This is not limited herein.

The iDBS divides a conventional base station device into two functional modules: a baseband unit (English full name: Baseband Unit, BBU for short) and a remote radio unit (English full name: Remote Radio Unit, RRU for short) respectively. Actually, the BBU and the RRU can form a base transceiver station (English full name: Base Transceiver Station, BTS for short). The BBU serves as a baseband subsystem, the RRU serves as a radio frequency subsystem, and the BBU and the RRU are connected by using an optical fiber.

Currently, a distributed base station architecture is widely used in a 3rd-generation mobile communications technology (English full name: The 3rd Generation, 3G for short) network and a 4th-generation mobile communications technology (English full name: The 4th Generation, 4G for short) network. One BBU can support multiple RRUs. Indoor coverage in a large venue can be well implemented by using a multi-channel solution of BBUs and RRUs. The BBUs are placed in an equipment room together, the RRUs may be installed on floors, and transmission is performed between the BBUs and the RRUs by using optical fibers. The present invention is applicable to a case in which an antenna is built in an RRU.

The BBU may mainly complete processing of a baseband signal, and generally include a signal processing unit, a transmission module, and a power pack. The RRU includes four modules: a digital intermediate frequency module, a transceiver module, a power amplification module, and a filtering module. The digital intermediate frequency module is configured to perform modulation and demodulation for optical transmission, perform digital up- and down-frequency conversion, perform analog/digital (English full name: Analog/Digital, A/D for short) conversion, and the like. The transceiver module completes conversion from an intermediate frequency signal to a radio frequency signal, and transmits the radio frequency signal by using an antenna port through the power amplification module and the filtering module.

Referring to FIG. 1, FIG. 1 is a schematic diagram of networking of an indoor distributed NodeB system according to the embodiments of the present invention. During actual deployment of an iDBS, a physical location of each RRU is known (that is, the RRU is an anchor node). An indoor positioning solution based on the iDBS can be implemented with reference to different conventional positioning methods. As shown in FIG. 1, a BBU and an RRU are connected by using an optical fiber. When a relatively large quantity of RRUs are required for indoor coverage, multiple RRUs may be first aggregated by using a remote radio unit hub (English full name: Remote Radio Unit Hub, RHUB for short) and then be interconnected with a BBU, thereby facilitating indoor wiring works. A main characteristic of an indoor distributed base station is that radio frequency information of RRUs is independent from each other, and radio frequency signals of all RRUs may be collected in a BBU for centralized processing.

Figure 2:
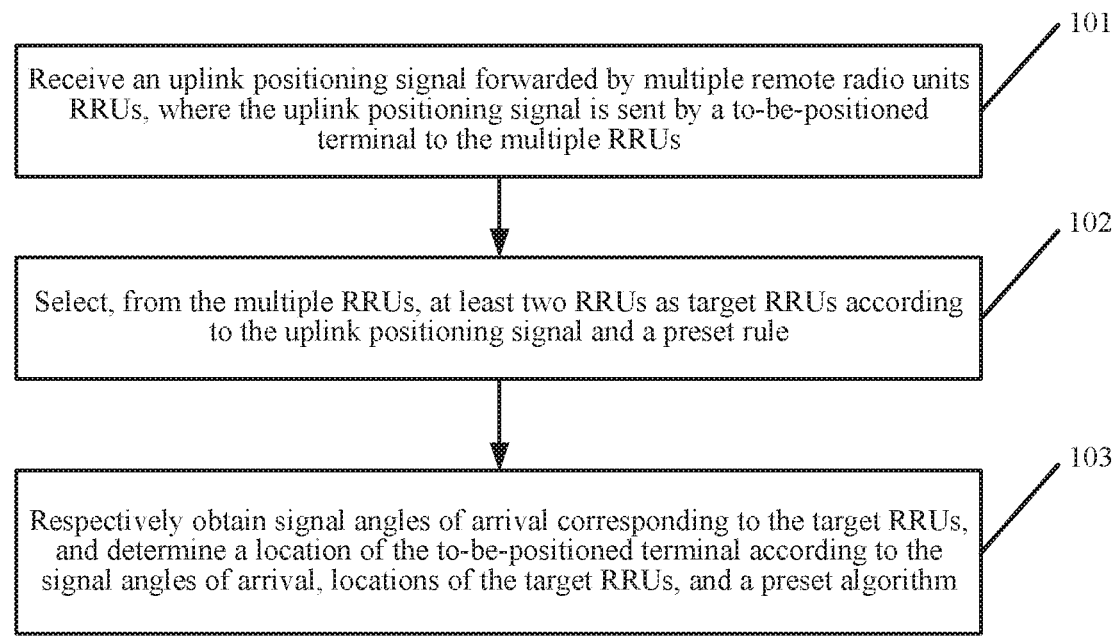
FIG. 2 is a schematic diagram of an embodiment of a terminal positioning method according to the embodiments of the present invention.

Referring to FIG. 2, an embodiment of a terminal positioning method of the embodiments of the present invention includes the following steps.

101: Receive an uplink positioning signal forwarded by multiple remote radio units RRUs, where the uplink positioning signal is sent by a to-be-positioned terminal to the multiple RRUs.

In this embodiment, the present invention is applied to a BBU in an indoor distributed NodeB system, the to-be-positioned terminal sends an uplink positioning signal to the multiple RRUs that are at different locations, and the multiple RRUs forward the uplink positioning signal to the BBU. Therefore, the BBU can receive the uplink positioning signal sent by the multiple RRUs.

102: Select, from the multiple RRUs, at least two RRUs as target RRUs according to the uplink positioning signal and a preset rule.

In this embodiment, the BBU selects at least two target RRUs from the multiple RRUs according to the received uplink positioning signal. To select the target RRUs, the preset rule needs to be set, so as to select RRUs meeting a condition. The target RRUs are RRUs used for positioning the terminal. Because at least two non-parallel straight lines can determine an intersection point, at least two target RRUs are required to serve as anchor nodes to draw at least two straight lines, and an intersection point of the straight lines is a location of the to-be-positioned terminal. If there are more than two RRUs, an enclosed region may be obtained. A centroid of the enclosed region is used as the location of the to-be-positioned terminal by using some conventional algorithms.

103: Respectively obtain signal angles of arrival corresponding to the target RRUs, and determine a location of the to-be-positioned terminal according to the signal angles of arrival, locations of the target RRUs, and a preset algorithm.

In this embodiment, the signal angles of arrival corresponding to the target RRUs are respectively obtained, and the locations of the target RRUs are obtained. The location may be a physical location of the target RRU. For example, a two-dimensional coordinate system is established to determine a coordinate location of the target RRU. Alternatively, the location of the target RRU may be prestored in the BBU, and may be directly invoked from the BBU when the location needs to be used. By now, an angle of arrival (English full name: Angle of Arrival, AOA for short) measuring method may be used to calculate the location of the to-be-positioned terminal according to the signal angles of arrival.

Figure 3:
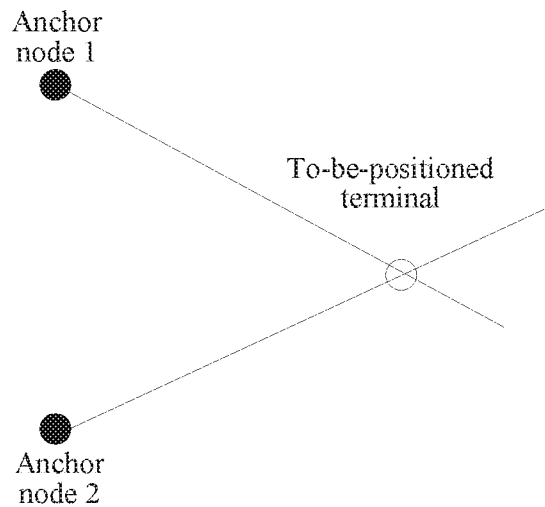
FIG. 3 is a schematic diagram of measuring a to-be-positioned terminal based on signal angles of arrival according to an embodiment of the present invention.

A method for determining the location of the to-be-positioned terminal by using an AOA positioning algorithm is described below. Referring to FIG. 3, FIG. 3 is a schematic diagram of measuring a to-be-positioned terminal based on signal angles of arrival according to the embodiments of the present invention. As shown in the figure, an anchor node 1 and an anchor node 2 may be considered as locations of two target RRUs respectively. Both of the target RRUs receive, by using antenna arrays, an uplink positioning signal sent by the to-be-positioned terminal. It can be understood that an RRU in this embodiment of the present invention has at least two receive antennas, and a current commercial RRU product already supports a built-in multi-antenna structure.

The signal angles of arrival are calculated by using the following formula:

$$\alpha = ar\cos((\lambda\theta)/(2\pi d)),$$

where θ is a phase difference between signals received by adjacent antenna array elements, λ is a wavelength of a radio signal, d is a distance between the antenna array elements, π is a circumference ratio, and α is the signal angle of arrival.

After the locations of the target RRUs and signal angles of arrival are known, the to-be-positioned terminal is located on straight lines of the target RRUs and the corresponding signal angles of arrival. Therefore, when angles of arrival from the to-be-positioned terminal to at least two anchor nodes are known, the location of the terminal can be obtained.

The preset algorithm may be an AOA-based positioning algorithm, and the AOA-based positioning algorithm is a commonly seen positioning algorithm. The algorithm has low communication overheads, and positioning precision is relatively high.

In this embodiment of the present invention, the BBU receives the uplink positioning signal sent by the multiple remote radio units RRUs; selects, from the multiple RRUs, the at least two RRUs as the target RRUs according to the uplink positioning signal and the preset rule; and respectively calculates the signal angles of arrival corresponding to the target RRUs, and determines the location of the to-be-positioned terminal according to the signal angles of arrival. It can be learned from the foregoing method that, the BBU selects target RRUs for positioning in an existing indoor coverage system according to the uplink positioning signal, reducing costs and time. In addition, according to the solution, positioning calculation is performed on a network side, reducing power consumption of a terminal, and calculation can be performed after performing communication only once, greatly reducing network load.

For ease of understanding, the at least two RRUs may be selected from the multiple RRUs as the target RRUs according to the uplink positioning signal in three manners. The terminal positioning method in the embodiments of the present invention is described below in terms of interaction between the BBU and the RRUs.

Manner 1: The target RRUs are selected according to a physical distance and a signal strength of the uplink positioning signal.

In the embodiments, the BBU may obtain a physical distance between every two of the at least two RRUs of the multiple RRUs, and obtain, according to the uplink positioning signal, a signal strength of the uplink positioning signal received by the multiple RRUs.

Optionally, based on the embodiment corresponding to FIG. 2, in a first optional embodiment of the terminal positioning method provided in the embodiments of the present invention, before the selecting, from the multiple RRUs, at least two RRUs as target RRUs according to the uplink positioning signal and a preset rule, the method may further include:

obtaining a physical distance between every two of the at least two RRUs.

The selecting, from the multiple RRUs, at least two RRUs as target RRUs according to the uplink positioning signal and a preset rule may include:

separately obtaining, according to the uplink positioning signal, a signal strength of the uplink positioning signal received by each of the multiple RRUs; and determining the at least two RRUs as the target RRUs when the physical distance between every two of the at least two RRUs is greater than a first preset value and a signal strength of the uplink positioning signal received by each of the at least two RRUs is greater than a second preset value.

Figure 4:
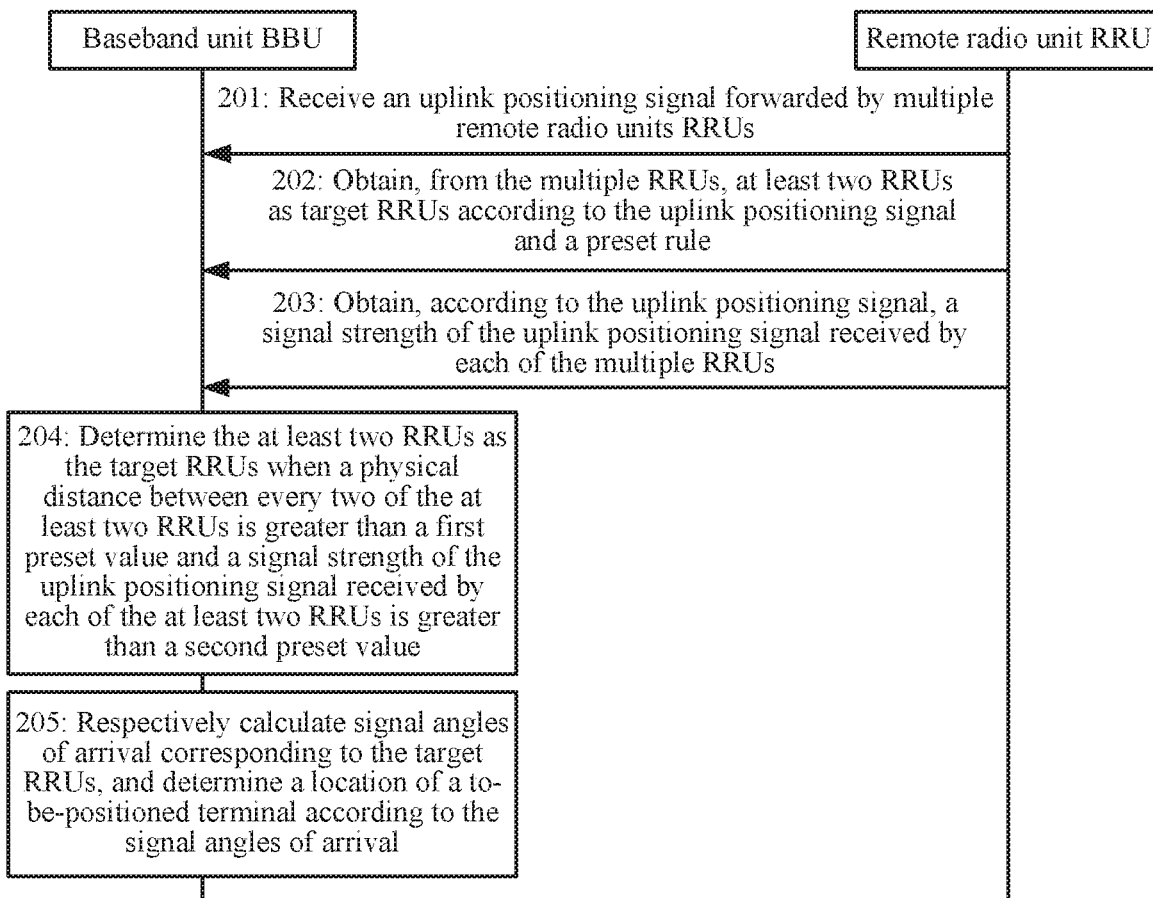
FIG. 4 is a schematic diagram of another embodiment of a terminal positioning method according to the embodiments of the present invention.

In this embodiment, a method for determining the target RRUs is provided. That is, a specific preset rule is described. Referring to FIG. 4, FIG. 4 is a schematic diagram of another embodiment of a terminal positioning method according to the embodiments of the present invention.

Step 201: A BBU receives an uplink positioning signal sent by multiple RRUs, where the uplink positioning signal is sent by a to-be-positioned terminal to the multiple RRUs.

Step 202: The BBU may obtain a physical distance between every two of at least two RRUs from the multiple RRUs. It is assumed that there are three RRUs in total: RRU1, RRU2, and RRU3 respectively. A physical distance between RRU1 and RRU2, a physical distance between RRU2 and RRU3, and a physical distance between RRU1 and RRU3 need to be obtained. By analog, if there are four RRUs, five RRUs, or even more RRUs, a physical distance between every two RRUs also needs to be obtained separately.

It should be noted that a physical distance between two RRUs may be obtained by using two-dimensional coordinates. For example, in a two-dimensional space, two RRUs that are used as anchor nodes are connected to form a straight line, and a two-dimensional coordinate system is constructed in a horizontal plane of the straight line. In this way, coordinates of the RRUs are obtained, and a physical distance between the two RRUs is obtained. Alternatively, when a physical distance between two RRUs is obtained, locations of the RRUs may be marked by using Global Positioning System (English full name: Global Positioning System, GPS for short) information, and the distance between the two RRUs is calculated according to the known marks. During actual application, a distance between two RRUs may alternatively be calculated in another manner. This is not limited herein.

Step 203: The BBU obtains, according to the uplink positioning signal, a signal strength of the uplink positioning signal received by the multiple RRUs. Detection may be performed by using signal strength test software, a detection result is expressed in unit of milliwatt (English full name: milliwatt, mW for short) or decibel milliwatt (English full name: decibel microwatt, dBm for short).

dBm is a value expressing an absolute power value, or may be considered as a ratio that uses power of 1 milliwatt as a reference. A calculation formula is 10 log(power value/1 milliwatt).

A conversion relationship between dBm and mW is as follows:

0 dBm=1 mW.

Step 204: The BBU needs to perform two determining operations. First, a first preset value and a second preset value are entered into a processing unit of the BBU by using an input device. The first preset value is a specified physical distance between two RRUs, and it is assumed that the first preset value is two meters. The second preset value is a specified signal strength of the uplink positioning signal received by an RRU, and it is assumed that the second preset value is −10 dBm. Then, whether the obtained physical distance between every two of the at least two RRUs is greater than the first preset value may be first determined. If three RRUs, that is, RRU1, RRU2, and RRU3 respectively are obtained, and a physical distance between RRU1 and RRU2 is five meters, a physical distance between RRU2 and RRU3 is six meters, and a physical distance between RRU1 and RRU3 is four meters, it is determined that the physical distance between every two of RRU1, RRU2, and RRU3 is greater than two meters, and the condition is met. Further, a signal strength of the uplink positioning signal received by RRU1, RRU2, and RRU3 is obtained. It is assumed that the signal strength of the uplink positioning signal received by RRU1 is 5 dBm, the signal strength of the uplink positioning signal received by RRU2 is 1 dBm, and the signal strength of the uplink positioning signal received by RRU3 is −5 dBm. The signal strength of the uplink positioning signal received by RRU1, RRU2, and RRU3 is greater than the second preset value −10 dBm. Therefore. RRU1, RRU2, and RRU3 are finally determined as target RRUs.

It should be noted that a sequence for performing the foregoing two determining operations is not limited, and if one of the determining operations fails, the at least two obtained RRUs cannot be used as the target RRUs. The at least two obtained RRUs can be used as the target RRUs when and only when the at least two RRUs meet both of the foregoing conditions.

Step 205: After target RRUs have been determined, respectively calculate signal angles of arrival corresponding to the target RRUs, and determine a location of the to-be-positioned terminal according to the signal angles of arrival.

Then, in this embodiment of the present invention, a method for selecting the target RRUs is provided: The physical distance between every two of the at least two RRUs of the multiple RRUs is obtained, and the signal strengths of the multiple RRUs are obtained according to the uplink positioning signal, so as to separately determine whether the physical distance between every two RRUs is greater than the first preset value and whether the signal strengths of the at least two RRUs of the multiple RRUs are greater than the second preset value. The at least two RRUs can be used as the target RRUs only when the at least two RRUs meet both of the foregoing two preset conditions. The BBU selects the RRUs according to the physical distance and the signal strengths, which can increase feasibility of the solution and help select more suitable RRUs as the target RRUs for calculating the signal angles of arrival. Therefore, a calculation result is closer to an actual value, thereby improving precision of the solution.

Manner 2: The target RRUs are selected according to channel state information (English full name: Channel State Information, CSI for short) from the to-be-positioned terminal to the RRUs.

In this embodiment, the BBU may obtain CSI from the to-be-positioned terminal to the multiple RRUs according to the uplink positioning signal.

Optionally, based on the embodiment corresponding to FIG. 2, in a second optional embodiment of the terminal positioning method provided in the embodiments of the present invention, the selecting, from the multiple RRUs, at least two RRUs as target RRUs according to the uplink positioning signal and a preset rule may include:
  obtaining channel state information of a channel from the to-be-positioned terminal to the multiple RRUs according to the uplink positioning signal; and
  when it is calculated, according to the channel state information, that a channel correlation coefficient between CSI of every two of the at least two RRUs is less than a third preset value, using the at least two RRUs that have the CSI between which the channel correlation coefficient is less than the third preset value as the target RRUs.

Figure 5:
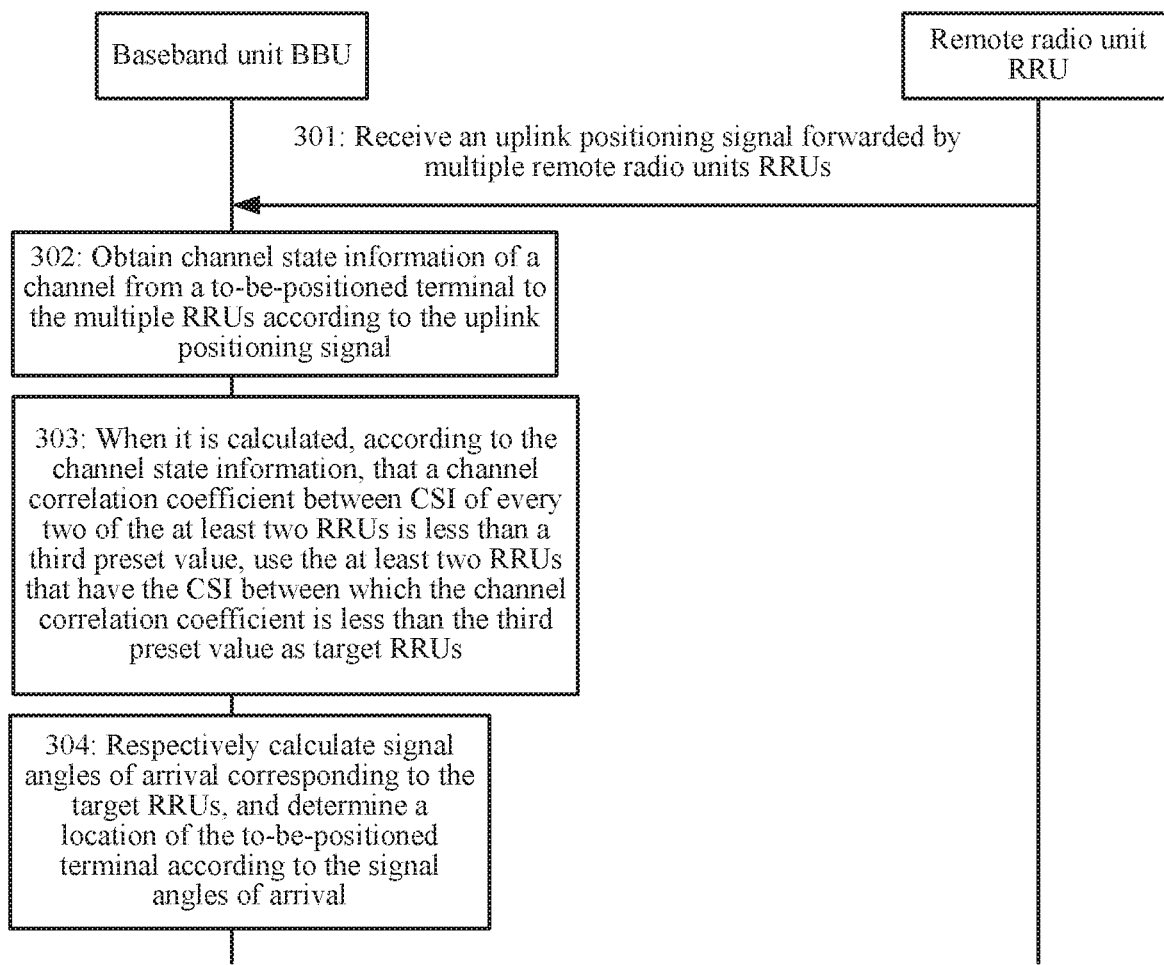
FIG. 5 is a schematic diagram of another embodiment of a terminal positioning method according to the embodiments of the present invention.

In this embodiment, another method for determining the target RRUs is provided. Referring to FIG. 5, FIG. 5 is a schematic diagram of another embodiment of a terminal positioning method according to the embodiments of the present invention.

Step 301: A BBU receives an uplink positioning signal sent by multiple RRUs, where the uplink positioning signal is sent by a to-be-positioned terminal to the multiple RRUs.

Step 302: The BBU parses the uplink positioning signal to obtain CSI from the to-be-positioned terminal to the RRUs. The CSI may be specifically channel estimation. For example, in a Long Term Evolution (English full name: Long Term Evolution, LTE for short) system, during transmit diversity, correlated demodulation, space multiplexing, and the like, a receive end can correctly demodulate aliased signals only by obtaining channel matrix information by means of channel estimation. In this case, the receive end needs to estimate a parameter of a channel when receiving information.

Channel estimation is a process of estimating a model parameter of an assumed channel model from received data. If a channel is linear, channel estimation is estimation of a system impulse response. It should be noted that channel estimation is a mathematical expression of an effect of a channel on an input signal, and high-quality channel estimation is an estimation algorithm minimizing an estimation error.

Step 303: First obtain that CSI from the to-be-positioned terminal to one of the at least two RRUs is a 2*1-dimensional channel matrix $H_1$, where it is assumed that the to-be-positioned terminal has one antenna and the RRU has two antennas, and then obtain that CSI from the to-be-positioned terminal to another one of the at least two RRUs is a 2*1-dimensional channel matrix $H_2$. In this way, a matrix $H=[H_1\ H_2]$, and the following formula is used to calculate a rank of an H-related matrix:

$$\frac{[\operatorname{trace}(H^H H)]^2}{\operatorname{trace}[(H^H H)^2]},$$

where $\operatorname{trace}(H^H H)$ represents a trace of a matrix ($H^H H$), which is equivalent to the sum of eigenvalues of ($H^H H$), and $(\ )^H$ represents a conjugate transpose operation for calculating a matrix. Calculating a rank of a matrix is transforming the matrix ($H^H H$) to an echelon form by means of elementary row conversion, and a quantity of nonzero rows in the matrix is defined as a rank of the matrix, which is denoted as $r(H^H H)$. If ($H^H H$) is an n-order matrix, when $r(H^H H)=n$, ($H^H H$) is referred to as a full rank matrix. However, the full rank matrix is not limited to the n-order matrix. If the rank of the matrix is equal to a quantity of rows, the matrix is referred to as a full-row-rank matrix: if the rank of the matrix is equal to a quantity of columns, the matrix is referred to as a full-column-rank matrix. If a matrix is both a full-row-rank matrix and a full-column-rank matrix, the matrix is an n-order matrix, that is, an n-order square matrix.

Therefore, for example, it can be learned from the foregoing descriptions that in the at least two RRUs, the channel matrix $H_1$ of the RRU and the channel matrix Hz of the another RRU are obtained, and the matrix $H=[H_1\ H_2]$. When it is calculated that the rank of the H-related matrix is 2, the matrix H is a full rank matrix, and it indicates that the two RRUs have a weak correlation. When it is calculated that the rank of the matrix is less than a quantity of dimensions of H, it indicates that the two RRUs have a relatively strong correlation.

A larger correlation coefficient indicates a stronger correlation; on the contrary, a smaller correlation coefficient indicates a weaker correlation. 1 indicates being completely correlated, and 0 indicates being completely uncorrelated. The following formula is used to calculate a channel correlation coefficient between CSI of two RRUs:

Channel correlation coefficient between two RRUs=1−Rank of a related matrix/Quantity of dimensions of the related matrix.

For example, if a quantity of dimensions of a related matrix of CSI between two RRUs is 2, and a rank of the related matrix is 2, a correlation coefficient is 0. Therefore, the two RRUs are completely uncorrelated.

It can be learned from this that a larger rank of a related matrix indicates a weaker correlation and a smaller correlation coefficient.

It should be noted that this embodiment is described by using an example of a correlation between two RRUs. During actual application, alternatively, a correlation between two groups of RRUs may be calculated, and a quantity of RRUs in each group is not limited herein.

In view of this, as a condition for selecting target RRUs, a channel correlation coefficient, that is, a third preset value, between every two RRUs needs to be preset. When channels are uncorrelated channels, a channel correlation coefficient is 0. When channels are completely correlated channels, a channel correlation coefficient is 1.

In this solution, two RRUs that have a relatively weak correlation should be selected as the target RRUs. It may be assumed that the third preset value is 0.5. When a channel correlation coefficient between CSI of every two of three RRUs is obtained, whether the channel correlation coefficient is less than 0.5 is determined. When and only when the channel correlation coefficient between the CSI of every two of the three RRUs is less than 0.5, the three RRUs are determined as the target RRUs.

Step 304: After target RRUs have been determined, respectively calculate signal angles of arrival corresponding to the target RRUs, and determine a location of the to-be-positioned terminal according to the signal angles of arrival.

Then, in this embodiment of the present invention, another method for selecting the target RRUs is provided: The BBU obtains the channel state information of the channel from the to-be-positioned terminal to the multiple RRUs according to the uplink positioning signal; and when it is calculated, according to the channel state information, that the channel correlation coefficient between the CSI of every two of the at least two RRUs is less than the third preset value, uses the at least two RRUs that have the CSI between which the channel correlation coefficient is less than the third preset value as the target RRUs. The BBU selects the RRUs according to the channel correlation coefficient, which can further increase feasibility and flexibility of the solution.

Manner 3: The target RRUs are selected according to a physical distance, a signal strength of the uplink positioning signal, and CSI from the to-be-positioned terminal to RRUs.

In this embodiment, the BBU may obtain a physical distance between every two of the at least two RRUs of the multiple RRUs, obtain, according to the uplink positioning signal, a signal strength of the uplink positioning signal received by the multiple RRUs, and obtain CSI from the to-be-positioned terminal to the multiple RRUs according to the uplink positioning signal.

Optionally, based on the embodiment corresponding to FIG. 2, in a third optional embodiment of the terminal positioning method provided in the embodiments of the present invention, before the selecting, from the multiple RRUs, at least two RRUs as target RRUs according to the uplink positioning signal and a preset rule, the method may further include:

obtaining a physical distance between every two of the at least two RRUs.

The selecting, from the multiple RRUs, at least two RRUs as target RRUs according to the uplink positioning signal and a preset rule may include:

separately obtaining, according to the uplink positioning signal, a signal strength of the uplink positioning signal received by each of the multiple RRUs and channel state information of a channel from the to-be-positioned terminal to the multiple RRUs; and determining the at least two RRUs as the target RRUs when the physical distance between every two of the at least two RRUs is greater than a first preset value, a signal strength of the uplink positioning signal received by each of the at least two RRUs is greater than a second preset value, and it is calculated, according to the channel state information, that a channel correlation coefficient between CSI of every two of the at least two RRUs is less than a third preset value.

In this embodiment, the target RRUs need to be selected in a manner of meeting all of three preset conditions with reference to the first and the second optional embodiments corresponding to FIG. 2.

Specifically, conditions that the target RRUs need to meet are preset: First, a physical distance between every two of the target RRUs is greater than a first preset value. Second, a strength of the uplink positioning signal received by each of the target RRUs is greater than a second preset value. Third, a channel correlation coefficient between CSI of every two of the target RRUs is less than a third preset value.

It can be understood that the technical means used in this embodiment is similar to those in the first and the second optional embodiments corresponding to FIG. 2. For understanding, refer to the foregoing embodiments, and details are not described herein again.

It should be noted that there is no sequence for the foregoing three determining operations, and if one of the determining operations fails, the at least two obtained RRUs cannot be used as the target RRUs. The at least two RRUs can be used as the target RRUs when and only when the at least two RRUs meet all of the foregoing conditions.

Then, in the embodiments of the present invention, still another method for selecting the target RRUs is provided: The physical distance between every two of the at least two RRUs of the multiple RRUs is obtained, the signal strengths of the multiple RRUs are determined according to the uplink positioning signal, and the channel state information of the channel from the to-be-positioned terminal to the multiple RRUs is obtained, so as to separately determine whether the foregoing three conditions are met, and determine an RRU meeting all of the three conditions as a target RRU. Therefore, the RRUs are selected, which can further increase feasibility of the solution. In addition, more accurate signal angles of arrival can be obtained by using the target RRU meeting all of the three conditions as the basis for calculating the signal angles of arrival, so that a more accurate location of the terminal can be determined.

Three methods for obtaining the target RRUs have been described in the first to the third optional embodiments corresponding to FIG. 2. Because there are at least two target RRUs, when the location of the terminal is determined by means of AOA positioning, descriptions may also be provided from two perspectives.

(1) There are two target RRUs.

Optionally, the respectively obtaining signal angles of arrival corresponding to the target RRUs, and determining a location of the to-be-positioned terminal according to the signal angles of arrival, locations of the target RRUs, and a preset algorithm may include:

when there are two target RRUs, calculating two signal angles of arrival corresponding to the two RRUs; and calculating a first location of the to-be-positioned terminal according to the two signal angles of arrival and locations of the target RRUs.

In this embodiment, when there are two target RRUs, the two signal angles of arrival corresponding to the two RRUs are calculated, and the first location of the to-be-positioned terminal is determined according to the calculated signal angles of arrival. The first location is a location of an intersection point of two intersecting lines drawn by using the two RRUs as anchor nodes.

Figure 6:
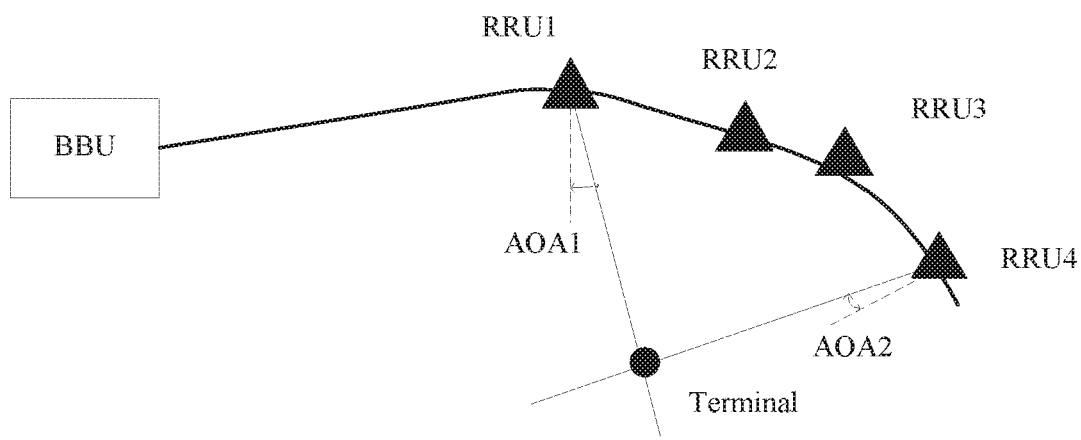
FIG. 6 is a schematic diagram of an embodiment of positioning a terminal by using two RRUs according to the embodiments of the present invention.

Referring to FIG. 6, FIG. 6 is a schematic diagram of an embodiment of positioning a terminal by using two RRUs according to the embodiments of the present invention. A two-dimensional coordinate system may be constructed according to two RRUs, and precise locations of the two RRUs are obtained by using positioning devices carried by the RRUs. The two RRUs both serve as the target RRUs and anchor nodes in this solution. In this way, a schematic diagram of another embodiment, corresponding to FIG. 6A, of positioning a terminal by using two RRUs according to the embodiments of the present invention is obtained. Nodes at other locations can only estimate locations of the nodes at the other locations according to the locations of the anchor nodes and a positioning mechanism. A percentage of the anchor nodes directly affects network costs. There are two types of node positioning algorithms according to whether ranging is required: a ranging-based positioning algorithm and a positioning algorithm that requires no ranging. The positioning algorithm that requires no ranging mainly includes a centroid algorithm and convex programming. The positioning algorithm that requires ranging has a low requirement on hardware, and usually has low positioning precision. The ranging-based positioning algorithm mainly includes a received signal strength indication (English full name: Received Signal Strength Indication, RSSI for short) method, a time of arrival (English full name: Time of Arrival, TOA for short) method of signal transmission, an observed time difference of arrival (English full name: Observed Time Difference of Arrival, OTDOA) method, an AOA method, and the like. Location information of an unknown node is calculated by measuring information about a distance or an angle between the unknown node and an anchor node and by means of trilateration, triangulation, or maximum likelihood estimation.

Figure 6A:
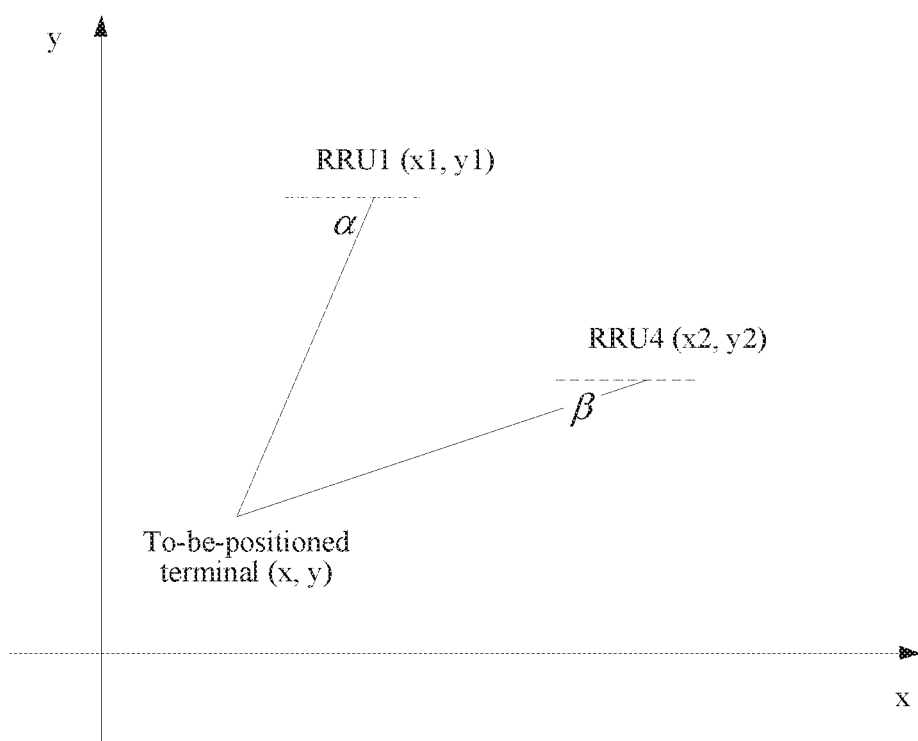
FIG. 6A is a schematic diagram of another embodiment of positioning a terminal by using two RRUs according to the embodiments of the present invention.

As shown in FIG. 6A, in a first step, a node is measured. With reference to the method described in step 103 in the embodiment corresponding to FIG. 2, RRU1 and RRU4 both receive, by using antenna arrays, an uplink positioning signal sent by the to-be-positioned terminal. Signal angles of arrival are separately calculated by using the following formulas:

$\alpha = ar\cos((\lambda\theta)/(2\pi d))$, where θ is a phase difference between signals received by adjacent antenna array elements, λ is a wavelength of a radio signal, d is a distance between the antenna array elements, π it is a circumference ratio, and α is the signal angle of arrival of RRU1; and $\beta = ar\cos((\lambda\theta)/(2\pi d))$, where θ is a phase difference between signals received by adjacent antenna array elements, λ is a wavelength of a radio signal, d is a distance between the antenna array elements, π is a circumference ratio, and β is the signal angle of arrival of RRU4.

In a second step, the BBU calculates a location of the to-be-positioned terminal according to stored locations of RRU1 and RRU4. A used manner is the same as that in the prior art. One of implementations is described by using an example herein, but is not limited to the following described method during actual application.

Still referring to FIG. 6A, it is assumed that normal lines of the antenna arrays of RRU1 and RRU4 are parallel to the X axis. θ is a phase difference between signals received by adjacent antenna array elements, λ is a wavelength of a radio signal, d is a distance between the antenna array elements, π is a circumference ratio, and β is the signal angle of arrival of RRU4.

In the second step, an equation is solved by using an angle-ray rule to calculate an estimated location of the unknown node. In this embodiment, the location of the unknown node is the location of the to-be-positioned terminal. It is assumed that coordinates of the unknown node are P(x, y). It is obtained by measurement that coordinates of RRU1 are $A(x_1, y_1)$, coordinates of RRU4 are $A(x_2, y_2)$, the signal angle of arrival AOA1 of RRU1 is α, and the signal angle of arrival AOA2 of RRU4 is β. The following equations need to be solved:

$$\begin{cases} y_1 - y = \tan\alpha(x_1 - x) \\ y_2 - y = \tan\beta(x_2 - x) \end{cases},$$

to obtain:

$$\begin{cases} x = \dfrac{y_2 - y_1 + x_1\tan\alpha - x_2\tan\beta}{\tan\alpha - \tan\beta} \\ y = \dfrac{\tan\alpha y_2 - \tan\beta y_1 + \tan\alpha\tan\beta x_1 - \tan\alpha\tan\beta x_2}{\tan\alpha - \tan\beta} \end{cases}.$$

By now, the coordinate location of the unknown node, that is, the to-be-positioned terminal can be obtained.

Still, in this embodiment of the present invention, a method for performing indoor positioning on the network side based on the signal angles of arrival when there are two target RRUs is provided, reducing power consumption of the terminal. In addition, in this process, the algorithm has low communication overheads, and positioning precision is relatively high. The BBU can process signals received by two RRUs together, with no need to perform synchronization and information exchange between multiple base stations that is performed in a conventional cellular system, improving efficiency of the solution during actual application, and enhancing practicability and operability of the solution.

(2) There are Multiple Target RRUs.

Optionally, the respectively obtaining signal angles of arrival corresponding to the target RRUs, and determining a location of the to-be-positioned terminal according to the signal angles of arrival, locations of the target RRUs, and a preset algorithm may include:

when there are more than two target RRUs, calculating more than two signal angles of arrival corresponding to the more than two RRUs; and calculating a second location of the to-be-positioned terminal according to the more than two signal angles of arrival and locations of the target RRUs.

In this embodiment, when there are multiple (more than two and excluding two) target RRUs, the signal angles of arrival corresponding to the multiple RRUs are calculated, and the second location of the to-be-positioned terminal is determined according to the calculated signal angles of arrival. The second location is a location in a region obtained after multiple intersecting lines are drawn by using the multiple RRUs as anchor nodes.

It should be noted that when positioning is performed by using the multiple RRUs, the method for measuring the signal angles of arrival of the two RRUs in the foregoing embodiment can still be used. That is, every two of the multiple RRUs are put into a group to obtain different arrangement combinations, signal angles of arrival of the two RRUs in each group are measured separately, and a coordinate location of an unknown node for each group is calculated in an existing calculation manner. In this way, coordinate locations of multiple unknown nodes can be obtained. The unknown node represents a terminal that is not positioned.

After the first step and the second step corresponding to a fourth optional embodiment corresponding to FIG. 2 are completed, coordinate locations of multiple unknown nodes can be obtained, and then the next step is performed.

In a third step, refinement and correction are performed. When there are multiple anchor nodes within a communication radius of an unknown node, there are inevitably multiple estimated locations. A centroid of an integrated pattern formed by the multiple estimated locations is used as a final estimated location of the to-be-positioned terminal.

Still, in this embodiment of the present invention, a method for performing indoor positioning on the network side based on the signal angles of arrival when there are multiple target RRUs is provided, reducing power consumption of the terminal. In addition, in this process, the algorithm has low communication overheads. When multiple RRUs are used as the target RRUs to position the terminal, because multiple signal angles of arrival can be obtained according to the multiple RRUs, a range is obtained when the location of the terminal is calculated, so as to determine the location of the terminal in the range. When there are multiple estimated locations, exclusion and refinement are performed on results to increase positioning precision, improving efficiency of the solution during actual application, and enhancing practicability and operability of the solution.

For ease of understanding, the terminal positioning method in the present invention is described in detail below by using a specific application scenario. Details are specifically as follows:

A to-be-positioned terminal sends an uplink positioning signal, and RRUs at different locations receive the uplink positioning signal and send the uplink positioning signal to a BBU. The BBU parses out CSI from the to-be-positioned terminal to the RRUs and a strength of the received uplink positioning signal according to the uplink positioning signal received by the RRUs. In addition, locations of the RRUs are determined by means of GPS and the locations of the RRUs are expressed by using coordinate points in a two-dimensional coordinate system.

Assuming that two RRUs need to be selected as target RRUs, conditions for selecting the target RRUs are preset. First, a physical distance between the two RRUs is greater than a first preset value, where it is assumed that the first preset value is two meters. Second, a strength of an uplink positioning signal that can be received by each of the two RRUs is greater than a second preset value, where the second preset value is −10 dBm. Third, a channel correlation coefficient between CSI of the two RRUs is less than a third preset value, where the third preset value is 0.5.

Figure 7:
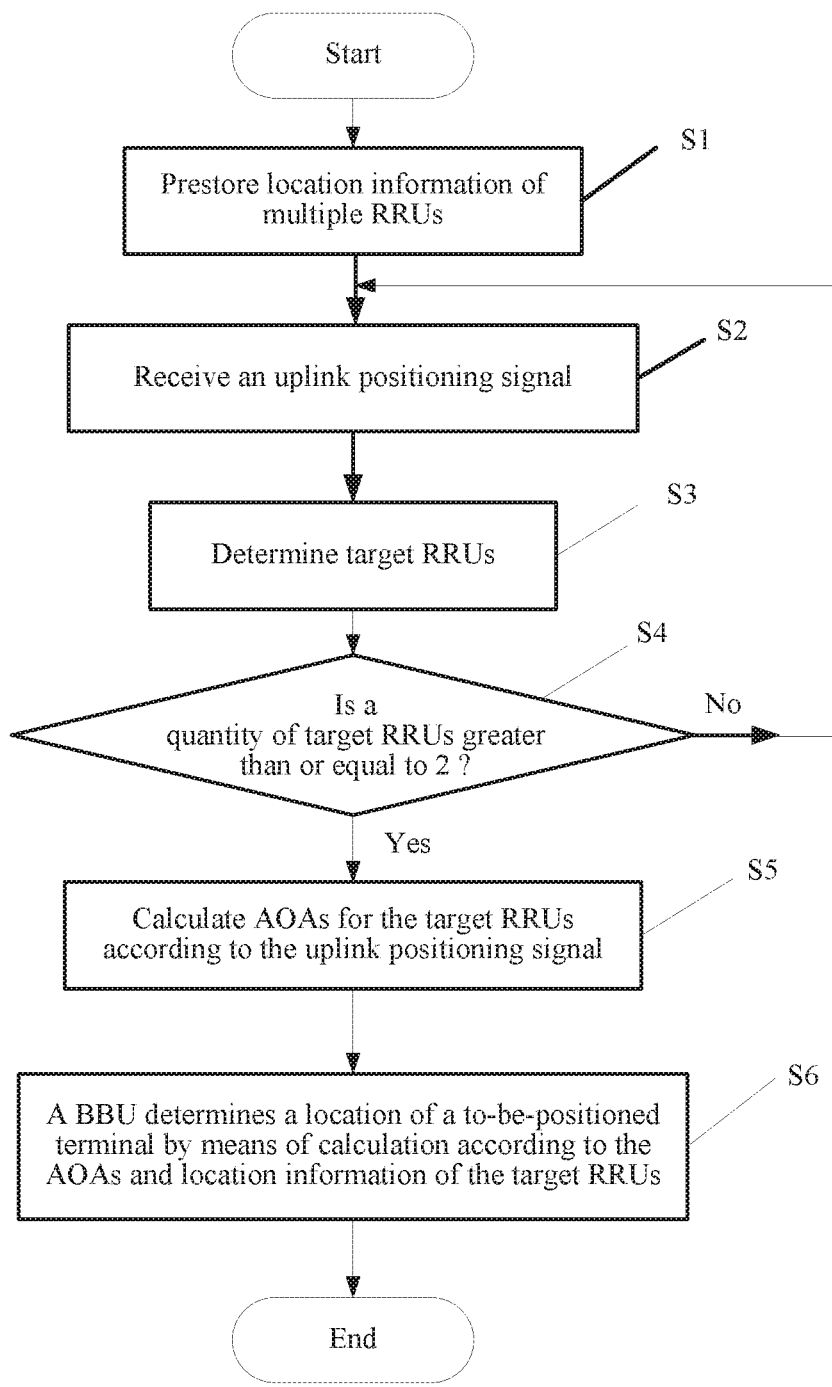
FIG. 7 is a flowchart of positioning a terminal in an application scenario of the present invention.

With reference to the foregoing three preset conditions. RRU1 and RRU2 are finally selected as the target RRUs. By now, referring to FIG. 7, FIG. 7 is a flowchart of positioning a terminal in an application scenario of the present invention. A location of the terminal can be obtained by using a process corresponding to the flowchart. Details are as follows:

Step S1: A BBU prestores location information of multiple RRUs, for example, a location of RRU1 is $(x_1, y_1)$, and a location of RRU2 is $(x_2, y_2)$.

Step S2: The BBU receives an uplink positioning signal, where the uplink positioning signal is sent by a to-be-positioned terminal to the multiple RRUs and forwarded by the multiple RRUs to the BBU.

Step S3: The BBU determines, according to a preset rule, target RRUs that are used as anchor nodes. The preset rule may be the following three rules: First, the target RRUs are selected according to a physical distance and a signal strength of the uplink positioning signal. Second, the target RRUs are selected according to CSI from the to-be-positioned terminal to the RRUs. Third, the target RRUs are selected according to a physical distance, a signal strength of the uplink positioning signal, and CSI from the to-be-positioned terminal to the RRUs.

Step S4: When it is determined, according to step S3, that a quantity of the target RRUs is greater than or equal to 2, step S5 continues to be performed: otherwise, return to step S2 to continue to receive an uplink positioning signal.

Step S5: The BBU calculates, according to information such as the received uplink positioning signal, an antenna distance between the RRUs, and a signal wavelength, AOAs at which a to-be-positioned signal arrives at the target RRUs.

Step S6: The BBU calculates a location of the to-be-positioned terminal according to the AOAs for the target RRUs calculated in step S5 and position information of the target RRUs.

Figure 8:
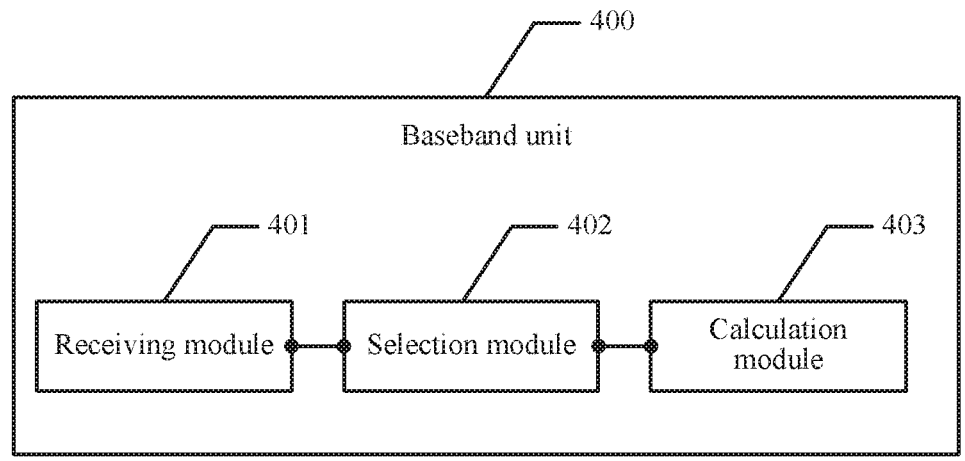
FIG. 8 is a schematic diagram of an embodiment of a baseband unit according to the embodiments of the present invention.

A network server in the present invention is described below in detail. Referring to FIG. 8, a baseband unit in the embodiments of the present invention is applied to an indoor distributed NodeB system, and includes:

a receiving module 401, configured to receive an uplink positioning signal forwarded by multiple remote radio units RRUs, where the uplink positioning signal is sent by a to-be-positioned terminal to the multiple RRUs;

a selection module 402, configured to select, from the multiple RRUs, at least two RRUs as target RRUs according to the uplink positioning signal received by the receiving module 401 and a preset rule; and a calculation module 403, configured to: respectively obtain signal angles of arrival corresponding to the target RRUs selected by the selection module 402, and determine a location of the to-be-positioned terminal according to the signal angles of arrival, locations of the target RRUs, and a preset algorithm.

In this embodiment, the receiving module 401 receives the uplink positioning signal forwarded by the multiple remote radio units RRUs, where the uplink positioning signal is sent by the to-be-positioned terminal to the multiple RRUs: the selection module 402 selects, from the multiple RRUs, the at least two RRUs as the target RRUs according to the uplink positioning signal received by the receiving module 401 and the preset rule; and the calculation module 403 respectively obtains the signal angles of arrival corresponding to the target RRUs selected by the selection module 402, and determines the location of the to-be-positioned terminal according to the signal angles of arrival, the locations of the target RRUs, and the preset algorithm.

In this embodiment of the present invention, the BBU receives the uplink positioning signal forwarded by the multiple remote radio units RRUs; selects, from the multiple RRUs, the at least two RRUs as the target RRUs according to the uplink positioning signal and the preset rule; and respectively calculates the signal angles of arrival corresponding to the target RRUs, and determines the location of the to-be-positioned terminal according to the signal angles of arrival. It can be learned from the foregoing method that, the BBU selects target RRUs for positioning in an existing indoor coverage system according to the uplink positioning signal, reducing costs and time. In addition, according to the solution, positioning calculation is performed on a network side, reducing power consumption of a terminal, and calculation can be performed after performing communication only once, greatly reducing network load.

Figure 9:
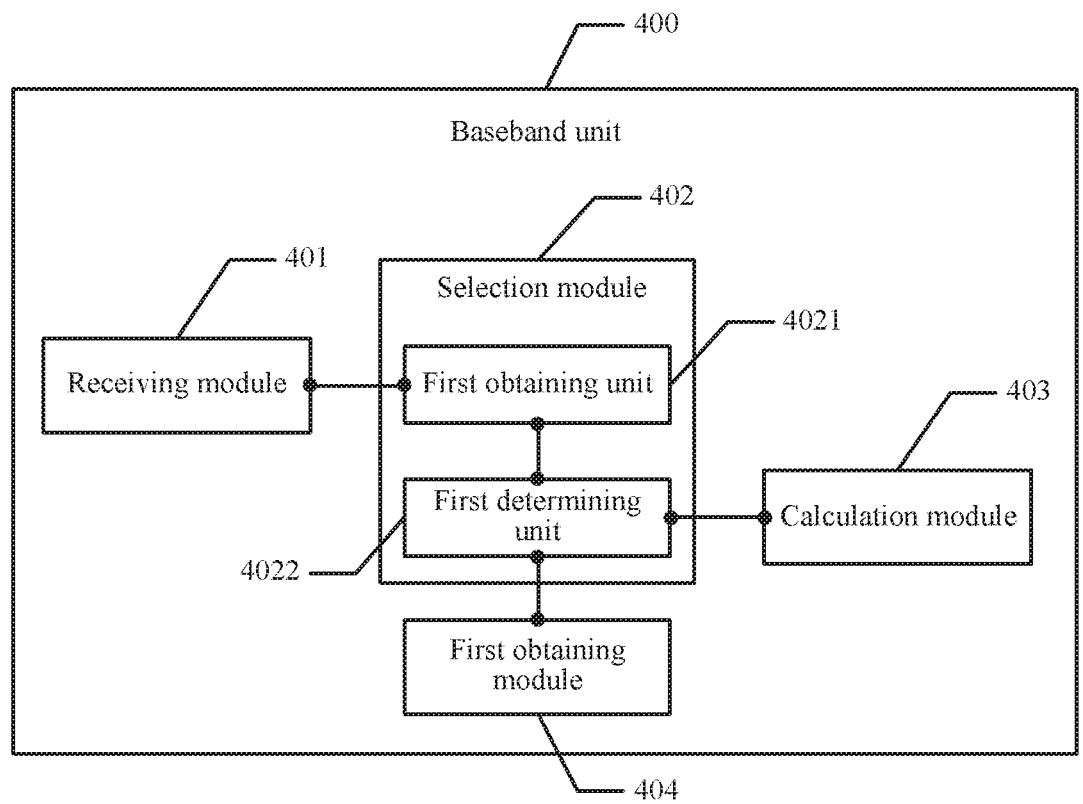
FIG. 9 is a schematic diagram of another embodiment of a baseband unit according to the embodiments of the present invention.

Referring to FIG. 9, another embodiment of a baseband unit according to the embodiments of the present invention includes:

a receiving module 401, configured to receive an uplink positioning signal forwarded by multiple remote radio units RRUs, where the uplink positioning signal is sent by a to-be-positioned terminal to the multiple RRUs;

a selection module 402, configured to select, from the multiple RRUs, at least two RRUs as target RRUs according to the uplink positioning signal received by the receiving module 401 and a preset rule; and a calculation module 403, configured to: respectively obtain signal angles of arrival corresponding to the target RRUs selected by the selection module 402, and determine a location of the to-be-positioned terminal according to the signal angles of arrival, locations of the target RRUs, and a preset algorithm, a first obtaining module 404, configured to obtain a physical distance between every two of the at least two RRUs of the multiple RRUs before the selection module 402 selects, from the multiple RRUs, the at least two RRUs as the target RRUs according to the uplink positioning signal and the preset rule.

The selection module 402 includes:

a first obtaining unit 4021, configured to separately obtain, according to the uplink positioning signal, a signal strength of the uplink positioning signal received by each of the multiple RRUs; and a first determining unit 4022, configured to determine the at least two RRUs as the target RRUs when the physical distance that is between every two of the at least two RRUs and that is obtained by the first obtaining module 404 is greater than a first preset value, and a signal strength that is of the uplink positioning signal received by each of the at least two RRUs and that is obtained by the first obtaining unit 4021 is greater than a second preset value.

Then, in this embodiment of the present invention, a method for selecting the target RRUs is provided. The physical distance between every two of the at least two RRUs of the multiple RRUs is obtained, and the signal strengths of the multiple RRUs are obtained according to the uplink positioning signal, so as to separately determine whether the physical distance between every two RRUs is greater than the first preset value and whether the signal strengths of the at least two RRUs of the multiple RRUs are greater than the second preset value. The at least two RRUs can be used as the target RRUs only when the at least two RRUs meet both of the foregoing two preset conditions. The BBU selects the RRUs according to the physical distance and the signal strengths, which can increase feasibility of the solution and help select more suitable RRUs as the target RRUs for calculating the signal angles of arrival. Therefore, a calculation result is closer to an actual value, thereby improving precision of the solution.

Figure 10:
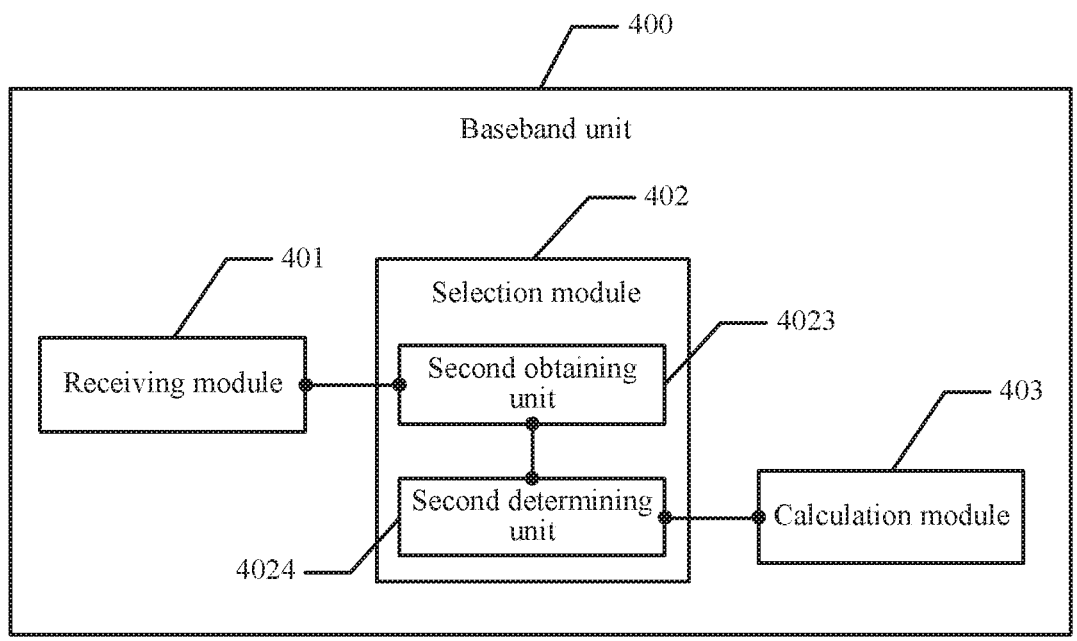
FIG. 10 is a schematic diagram of another embodiment of a baseband unit according to the embodiments of the present invention.

Referring to FIG. 10, another embodiment of a baseband unit according to the embodiments of the present invention includes:

a receiving module 401, configured to receive uplink positioning signal forwarded by multiple remote radio units RRUs, where the uplink positioning signal is sent by a to-be-positioned terminal to the multiple RRUs;

a selection module 402, configured to select, from the multiple RRUs, at least two RRUs as target RRUs according to the uplink positioning signal received by the receiving module 401 and a preset rule; and a calculation module 403, configured to: respectively obtain signal angles of arrival corresponding to the target RRUs selected by the selection module 402, and determine a location of the to-be-positioned terminal according to the signal angles of arrival, locations of the target RRUs, and a preset algorithm.

The selection module 402 includes:

a second obtaining unit 4023, configured to obtain channel state information of a channel from the to-be-positioned terminal to the multiple RRUs according to the uplink positioning signal; and a second determining unit 4024, configured to: when it is calculated, according to the channel state information obtained by the second obtaining unit 4023, that a channel correlation coefficient between CSI of every two of the at least two RRUs is less than a third preset value, use the at least two RRUs that have the CSI between which the channel correlation coefficient is less than the third preset value as the target RRUs.

Then, in this embodiment of the present invention, another method for selecting the target RRUs is provided. The BBU obtains the channel state information of the channel from the to-be-positioned terminal to the multiple RRUs according to the uplink positioning signal; and when it is calculated, according to the channel state information, that the channel correlation coefficient between the CSI of every two of the at least two RRUs is less than the third preset value, uses the at least two RRUs that have the CSI between which the channel correlation coefficient is less than the third preset value as the target RRUs. The BBU selects the RRUs according to the channel correlation coefficient, which can further increase feasibility and flexibility of the solution.

Figure 11:
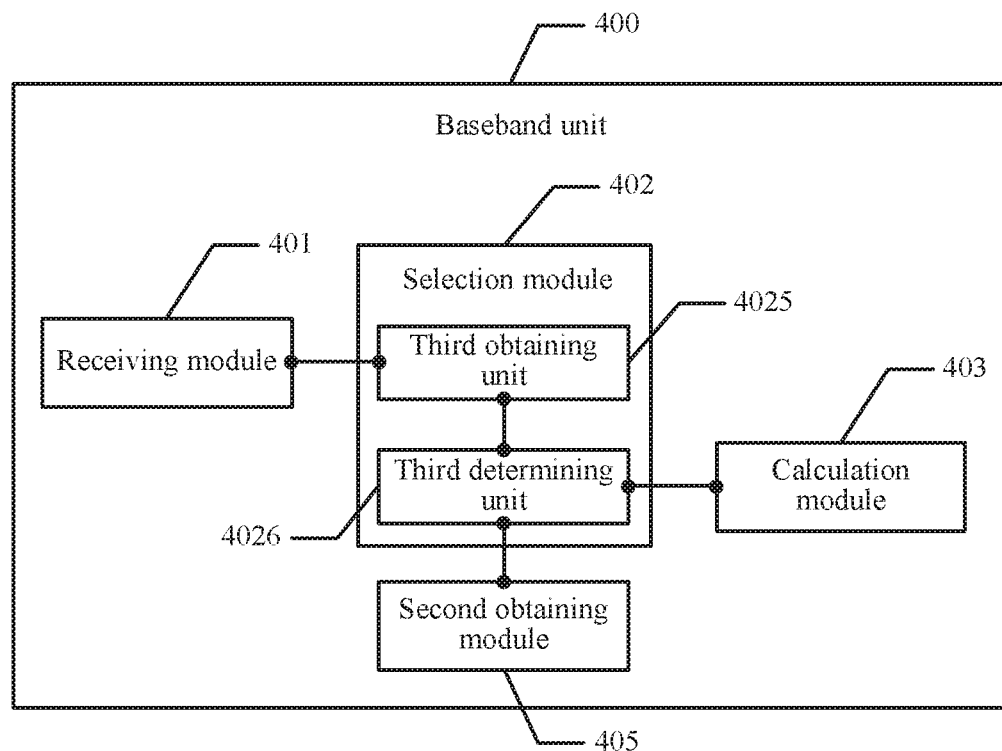
FIG. 11 is a schematic diagram of another embodiment of a baseband unit according to the embodiments of the present invention.

Referring to FIG. 11, another embodiment of a baseband unit according to the embodiments of the present invention includes:

a receiving module 401, configured to receive an uplink positioning signal forwarded by multiple remote radio units RRUs, where the uplink positioning signal is sent by a to-be-positioned terminal to the multiple RRUs;

a selection module 402, configured to select, from the multiple RRUs, at least two RRUs as target RRUs according to the uplink positioning signal received by the receiving module 401 and a preset rule; and a calculation module 403, configured to: respectively obtain signal angles of arrival corresponding to the target RRUs selected by the selection module 402, and determine a location of the to-be-positioned terminal according to the signal angles of arrival, locations of the target RRUs, and a preset algorithm;

a second obtaining module 405, configured to obtain a physical distance between every two of at least two RRUs from the multiple RRUs before the selection module 402 selects, from the multiple RRUs, the at least two RRUs as the target RRUs according to the uplink positioning signal and the preset rule.

The selection module 402 includes:

a third obtaining unit 4025, configured to separately obtain, according to the uplink positioning signal, a signal strength of the uplink positioning signal received by each of the multiple RRUs and channel state information of a channel from the to-be-positioned terminal to the multiple RRUs; and a third determining unit 4026, configured to determine the at least two RRUs as the target RRUs when the physical distance that is between every two of the at least two RRUs and that is obtained by the second obtaining module 405 is greater than a first preset value, a signal strength that is of the uplink positioning signal received by each of the at least two RRUs and that is obtained by the third obtaining unit 4025 is greater than a second preset value, and it is calculated, according to the channel state information, that a channel correlation coefficient between CSI of every two of the at least two RRUs is less than a third preset value.

Then, in this embodiment of the present invention, still another method for selecting the target RRUs is provided. The physical distance between every two of the at least two RRUs of the multiple RRUs is obtained, the signal strengths of the multiple RRUs are determined according to the uplink positioning signal, and the channel state information of the channel from the to-be-positioned terminal to the multiple RRUs is obtained, so as to separately determine whether the foregoing three conditions are met, and determine an RRU meeting all of the three conditions as a target RRU. Therefore, the RRUs are selected, which can further increase feasibility of the solution. In addition, more accurate signal angles of arrival can be obtained by using the target RRU meeting all of the three conditions as the basis for calculating the signal angles of arrival, so that a more accurate location of the terminal can be determined.

Figure 12:
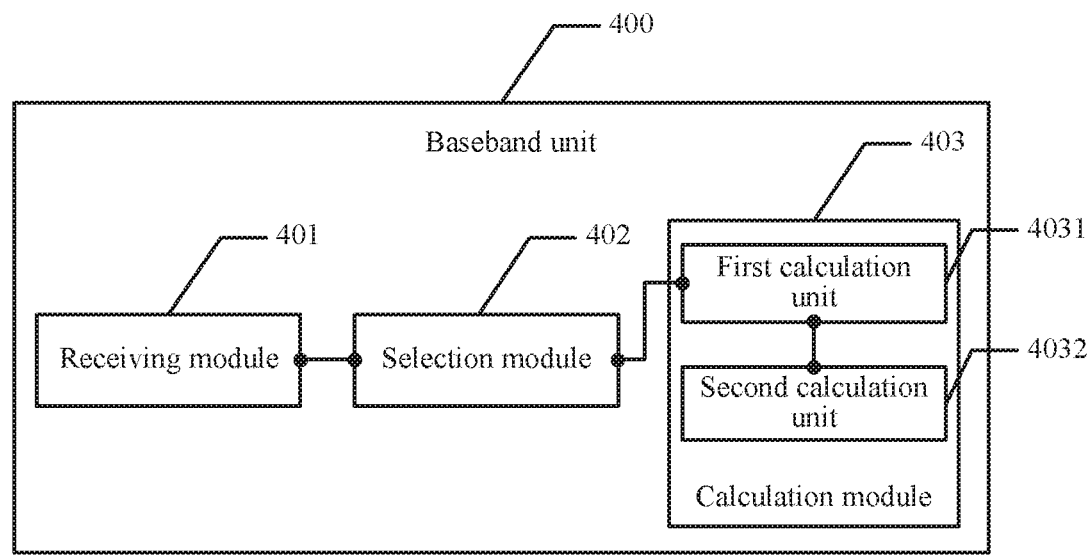
FIG. 12 is a schematic diagram of another embodiment of a baseband unit according to the embodiments of the present invention.

Referring to FIG. 12, another embodiment of a baseband unit according to the embodiments of the present invention includes:

a receiving module 401, configured to receive an uplink positioning signal forwarded by multiple remote radio units RRUs, where the uplink positioning signal is sent by a to-be-positioned terminal to the multiple RRUs;

a selection module 402, configured to select, from the multiple RRUs, at least two RRUs as target RRUs according to the uplink positioning signal received by the receiving module 401 and a preset rule; and a calculation module 403, configured to: respectively obtain signal angles of arrival corresponding to the target RRUs selected by the selection module 402, and determine a location of the to-be-positioned terminal according to the signal angles of arrival, locations of the target RRUs, and a preset algorithm.

The calculation module 403 includes:

a first calculation unit 4031, configured to calculate the signal angles of arrival corresponding to the target RRUs according to the following manner:

$$\alpha = ar\cos((\lambda\theta)/(2\pi d)),$$

where $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and a second calculation unit 4032, configured to calculate the location of the to-be-positioned terminal according to the at least two signal angles of arrival calculated by the first calculation unit 4031, the locations of the target RRUs, and the preset algorithm.

Then, in this embodiment of the present invention, a method for calculating the signal angles of arrival corresponding to the target RRUs is provided. Indoor positioning is performed on the network side based on the signal angles of arrival, reducing power consumption of the terminal. In addition, in this process, the algorithm has low communication overheads. The BBU can process signals received by two RRUs together. Alternatively, when multiple RRUs are used as the target RRUs to position the terminal, because multiple signal angles of arrival can be obtained according to the multiple RRUs, a range is obtained when the location of the terminal is calculated, so as to determine the location of the terminal in the range. When there are multiple estimated locations, exclusion and refinement are performed on results to increase positioning precision, improving efficiency of the solution during actual application, and enhancing practicability and operability of the solution.

Figure 13:
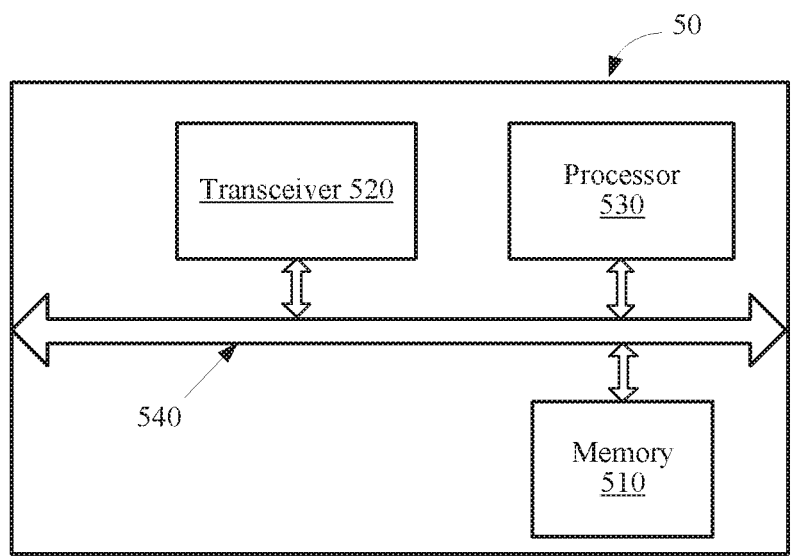
FIG. 13 is a schematic structural diagram of an embodiment of a baseband unit according to the embodiments of the present invention.

FIG. 13 is a schematic structural diagram of a baseband unit 50 according to an embodiment of the present invention. The baseband unit 50 may include a memory 510, a transceiver 520, a processor 530, and a bus system 540.

The memory 510 may include a read-only memory and a random access memory, and provide an instruction and data to the processor 530. A part of the memory 510 may further include a non-volatile random access memory (English full name: Non-Volatile Random Access Memory, NVRAM for short).

The memory 510 stores the following elements, executable modules, or data structures, or a subset thereof, or an extended set thereof:

operation instructions, including various operation instructions, and used to implement various operations; and an operating system, including various system programs, and used to implement various fundamental services and process hardware-based tasks.

The transceiver 520 is an apparatus for signal conversion, and is usually an optical fiber transceiver. The optical fiber transceiver performs conversion between a twisted-pair electrical signal and an optical signal, ensuring smooth transmission of a data packet between the two networks.

The transceiver 520 in this embodiment of the present invention is configured to:

receive an uplink positioning signal forwarded by multiple remote radio units RRUs, where the uplink positioning signal is sent by a to-be-positioned terminal to the multiple RRUs.

The processor 530 in this embodiment of the present invention is configured to:
  select, from the multiple RRUs, at least two RRUs as target RRUs according to the uplink positioning signal and a preset rule; and
  respectively obtain signal angles of arrival corresponding to the target RRUs, and determine a location of the to-be-positioned terminal according to the signal angles of arrival, locations of the target RRUs; and a preset algorithm.

The processor 530 controls an operation of the baseband unit 50. The processor 530 may also be referred to as a central processing unit (English full name: Central Processing Unit, CPU for short). The memory 510 may include a read-only memory and a random access memory, and provide an instruction and data to the processor 530. A part of the memory 510 may further include an NVRAM. During specific application, components of the baseband unit 50 are coupled together by using the bus system 540. In addition to a data bus, the bus system 540 may further include a power bus, a control bus, a status signal bus, and the like. However, for clear description, various types of buses in the figure are marked as the bus system 540.

The methods disclosed in the foregoing embodiments of the present invention may be applied to the processor 530, or are implemented by the processor 530. The processor 530 may be an integrated circuit chip and have a signal processing capability. During implementation, each step of the foregoing methods may be implemented by a hardware integrated logical circuit in the processor 530 or by using an instruction in a software form. The processor 530 may be a general-purpose processor, a digital signal processor (English full name: Digital Signal Processor, DSP for short), an application-specific integrated circuit (English full name: Application Specific Integrated Circuit, ASIC for short), a field-programmable gate array (English full name: Field-Programmable Gate Array, FPGA for short) or another programmable logical device, a discrete gate or transistor logical device, or a discrete hardware component. The processor may implement or perform the methods, the steps, and logical block diagrams that are disclosed in the embodiments of the present invention. The general-purpose processor may be a microprocessor, or the processor may be any conventional processor, or the like. Steps of the methods disclosed with reference to the embodiments of the present invention may be directly performed and completed by using a hardware decoding processor, or may be performed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 510; and the processor 530 reads information in the memory 510 and completes the steps in the foregoing methods in combination with hardware of the processor.

Optionally, the processor 530 is specifically configured to:
  obtain a physical distance between every two of the at least two RRUs;
  separately obtain, according to the uplink positioning signal, a signal strength of the uplink positioning signal received by each of the multiple RRUs; and
  determine the at least two RRUs as the target RRUs when the physical distance between every two of the at least two RRUs is greater than a first preset value and a signal strength of the uplink positioning signal received by each of the at least two RRUs is greater than a second preset value.

Optionally, the processor 530 is specifically configured to:
  obtain channel state information of a channel from the to-be-positioned terminal to the multiple RRUs according to the uplink positioning signal; and
  when it is calculated, according to the channel state information, that a channel correlation coefficient between CSI of every two of the at least two RRUs is less than a third preset value, use the at least two RRUs that have the CSI between which the channel correlation coefficient is less than the third preset value as the target RRUs.

Optionally, the processor 530 is specifically configured to:
  obtain a physical distance between every two of the at least two RRUs;
  separately obtain, according to the uplink positioning signal, a signal strength of the uplink positioning signal received by each of the multiple RRUs and channel state information of a channel from the to-be-positioned terminal to the multiple RRUs; and
  determine the at least two RRUs as the target RRUs when the physical distance between every two of the at least two RRUs is greater than a first preset value, a signal strength of the uplink positioning signal received by each of the at least two RRUs is greater than a second preset value, and it is calculated, according to the channel state information, that a channel correlation coefficient between CSI of every two of the at least two RRUs is less than a third preset value.

For related descriptions of FIG. 13, refer to the related descriptions and effects of the method in FIG. 2. Details are not further described herein.

Figure 14:
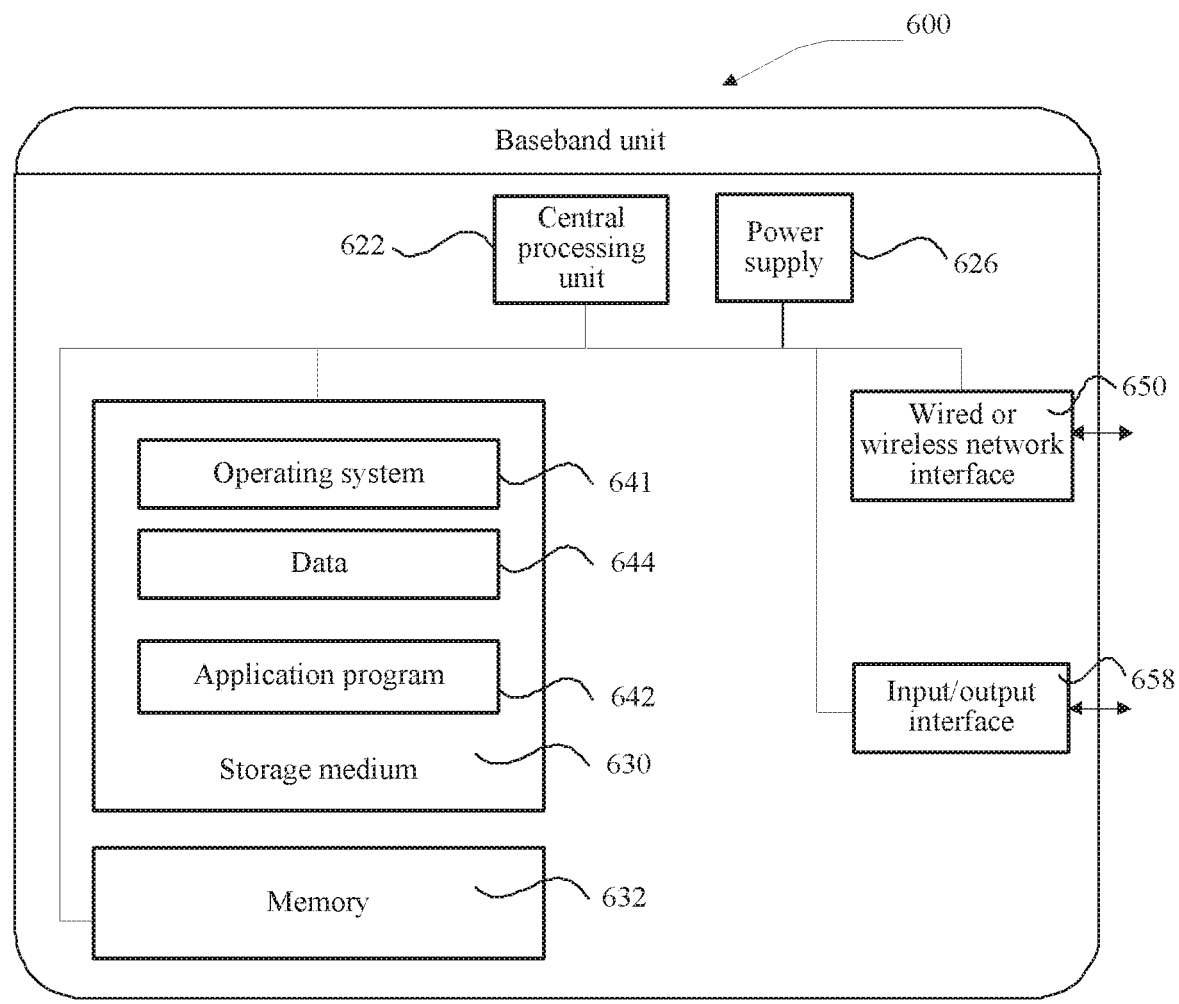
FIG. 14 is a schematic structural diagram of another embodiment of a baseband unit according to the embodiments of the present invention.

FIG. 14 is a schematic structural diagram of a baseband unit according to an embodiment of the present invention. There may be a great difference for the baseband unit 600 due to different configurations or performance. The baseband unit 600 may include one or more central processing units (English full name: central processing units, CPU for short) 622 (for example, one or more processors), a memory 632, and one or more storage mediums 630 (for example, one or more mass storage devices) for storing application programs 642 or data 644. The memory 632 and the storage medium 630 may be transient storages or persistent storages. A program stored in the storage medium 630 may include one or more modules (not shown in the figure), and each module may include a series of instruction operations in the server. Further, the central processing unit 622 may be configured to communicate with the storage medium 630, and perform a series of instruction operations in the storage medium 630 in the baseband unit 600.

The baseband unit 600 may further include one or more power supplies 626, one or more wired or wireless network interfaces 650, one or more input/output interfaces 658, and/or one or more operating systems 641 such as Windows Server™, Mac OS X™, Unix™, Linux™, and FreeBSD™.

The input/output interface 658 is configured to:
  receive an uplink positioning signal forwarded by multiple remote radio units RRUs, where the uplink positioning signal is sent by a to-be-positioned terminal to the multiple RRUs.

The central processing unit 622 is configured to:
  select, from the multiple RRUs, at least two RRUs as target RRUs according to the uplink positioning signal and a preset rule; and respectively obtain signal angles of arrival corresponding to the target RRUs, and determine a location of the to-be-positioned terminal according to the signal angles of arrival, locations of the target RRUs, and a preset algorithm.

The central processing unit 622 is further configured to:

obtain a physical distance between every two of the at least two RRUs:

separately obtain, according to the uplink positioning signal, a signal strength of the uplink positioning signal received by each of the multiple RRUs; and determine the at least two RRUs as the target RRUs when the physical distance between every two of the at least two RRUs is greater than a first preset value and a signal strength of the uplink positioning signal received by each of the at least two RRUs is greater than a second preset value.

The central processing unit 622 is further configured to:

obtain channel state information of a channel from the to-be-positioned terminal to the multiple RRUs according to the uplink positioning signal; and when it is calculated, according to the channel state information, that a channel correlation coefficient between CSI of every two of the at least two RRUs is less than a third preset value, use the at least two RRUs that have the CSI between which the channel correlation coefficient is less than the third preset value as the target RRUs.

The central processing unit 622 is further configured to:

obtain a physical distance between every two of the at least two RRUs;

separately obtain, according to the uplink positioning signal, a signal strength of the uplink positioning signal received by each of the multiple RRUs and channel state information of a channel from the to-be-positioned terminal to the multiple RRUs; and determine the at least two RRUs as the target RRUs when the physical distance between every two of the at least two RRUs is greater than a first preset value, a signal strength of the uplink positioning signal received by each of the at least two RRUs is greater than a second preset value, and it is calculated, according to the channel state information, that a channel correlation coefficient between CSI of every two of the at least two RRUs is less than a third preset value.

The central processing unit 622 is further configured to:

calculate the signal angles of arrival corresponding to the target RRUs according to the following manner:

$$\alpha = ar\cos((\lambda\theta)/(2\pi d)),$$

where α represents the signal angles of arrival corresponding to the target RRUs, λ represents a wavelength of a radio signal, θ represents a phase difference between signals received by adjacent antenna array elements, d represents a distance between the antenna array elements, and π is a circumference ratio; and calculate the location of the to-be-positioned terminal according to the at least two calculated signal angles of arrival, the locations of the target RRUs, and the preset algorithm.

The steps performed by the baseband unit in the foregoing embodiments may be based on the server structure shown in FIG. 14.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (English full name: Read-Only Memory, ROM for short), a random access memory (English full name: Random Access Memory, RAM for short), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A terminal positioning method, wherein the method is applied to a baseband unit (BBU) in an indoor distributed NodeB system, and the method comprises:

receiving an uplink positioning signal forwarded by multiple remote radio units (RRUs), wherein the uplink positioning signal is sent by a to-be-positioned terminal to the multiple RRUs;

selecting, from the multiple RRUs, at least two RRUs as target RRUs according to the uplink positioning signal and a physical distance, wherein selecting comprises:

separately obtaining, according to the uplink positioning signal, a signal strength of the uplink positioning signal received by each of the multiple RRUs; and selecting the at least two RRUs as the target RRUs in response to determining that the physical distance between every two of the at least two RRUs is greater than a first preset value and a signal strength of the uplink positioning signal received by each of the at least two RRUs is greater than a second preset value; and respectively obtaining signal angles of arrival corresponding to the target RRUs, and determining a location of the to-be-positioned terminal according to the signal angles of arrival, locations of the target RRUs, and a preset algorithm.

2. The method according to claim 1, wherein the respectively obtaining signal angles of arrival corresponding to the target RRUs, and determining the location of the to-be-positioned terminal according to the signal angles of arrival, locations of the target RRUs, and the preset algorithm comprises:

calculating the signal angles of arrival corresponding to the target RRUs according to the following manner:

$\alpha = ar\cos((\lambda\theta)/(2\pi d))$, wherein $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and calculating the location of the to-be-positioned terminal according to the calculated signal angles of arrival, the locations of the target RRUs, and the preset algorithm.

3. A terminal positioning method, wherein the method is applied to a baseband unit (BBU) in an indoor distributed NodeB system, and the method comprises:

receiving an uplink positioning signal forwarded by multiple remote radio units (RRUs), wherein the uplink positioning signal is sent by a to-be-positioned terminal to the multiple RRUs;

selecting, from the multiple RRUs, at least two RRUs as target RRUs according to the uplink positioning signal and a physical distance, wherein selecting comprises:

separately obtaining, according to the uplink positioning signal, a signal strength of the uplink positioning signal received by each of the multiple RRUs and channel state information of a channel from the to-be-positioned terminal to the multiple RRUs; and selecting the at least two RRUs as the target RRUs in response to determining that the physical distance between every two of the at least two RRUs is greater than a first preset value, a signal strength of the uplink positioning signal received by each of the at least two RRUs is greater than a second preset value, and a channel correlation coefficient between channel state information of every two of the at least two RRUs is less than a third preset value; and respectively obtaining signal angles of arrival corresponding to the target RRUs, and determining a location of the to-be-positioned terminal according to the signal angles of arrival, locations of the target RRUs, and a preset algorithm.

4. The method according to claim 3, wherein the respectively obtaining signal angles of arrival corresponding to the target RRUs, and determining the location of the to-be-positioned terminal according to the signal angles of arrival, locations of the target RRUs, and the preset algorithm comprises:

calculating the signal angles of arrival corresponding to the target RRUs according to the following manner:

$\alpha = ar\cos((\lambda\theta)/(2\pi d))$, wherein $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and calculating the location of the to-be-positioned terminal according to the calculated signal angles of arrival, the locations of the target RRUs, and the preset algorithm.

5. A baseband unit in an indoor distributed NodeB system, wherein the baseband unit comprises:

a receiver, configured to receive an uplink positioning signal forwarded by multiple remote radio units (RRUs), wherein the uplink positioning signal is sent by a to-be-positioned terminal to the multiple RRUs;

a non-transitory memory storage comprising instructions; and one or more hardware processors in communication with the memory storage, wherein the one or more hardware processors execute the instructions to:

select, from the multiple RRUs, at least two RRUs as target RRUs according to the uplink positioning signal and a physical distance, wherein the one or more hardware processors execute the instructions to select the at least two RRUs as the target RRUs comprises the one or more hardware processors execute the instructions to:

separately obtain, according to the uplink positioning signal, a signal strength of the uplink positioning signal received by each of the multiple RRUs; and select the at least two RRUs as the target RRUs in response to determining that the physical distance between every two of the at least two RRUs is greater than a first preset value and a signal strength of the uplink positioning signal received by each of the at least two RRUs is greater than a second preset value; and respectively obtain signal angles of arrival corresponding to the target RRUs, and determine a location of the to-be-positioned terminal according to the signal angles of arrival, locations of the target RRUs, and a preset algorithm.

6. The baseband unit according to claim 5, wherein the one or more hardware processors execute the instructions to:

calculate the signal angles of arrival corresponding to the target RRUs according to the following manner:

$\alpha = ar\cos((\lambda\theta)/(2\pi d))$, wherein $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and calculate the location of the to-be-positioned terminal according to the signal angles of arrival, the locations of the target RRUs, and the preset algorithm.

7. A baseband unit in an indoor distributed NodeB system, wherein the baseband unit comprises:
- a receiver, configured to receive an uplink positioning signal forwarded by multiple remote radio units (RRUs), wherein the uplink positioning signal is sent by a to-be-positioned terminal to the multiple RRUs;
- a non-transitory memory storage comprising instructions; and
- one or more hardware processors in communication with the memory storage, wherein the one or more hardware processors execute the instructions to:
  - select, from the multiple RRUs, at least two RRUs as target RRUs according to the uplink positioning signal and a physical distance, wherein the one or more hardware processors execute the instructions to select the at least two RRUs as the target RRUs comprises the one or more hardware processors execute the instructions to:
    - separately obtain, according to the uplink positioning signal, a signal strength of the uplink positioning signal received by each of the multiple RRUs and channel state information of a channel from the to-be-positioned terminal to the multiple RRUs; and
    - select the at least two RRUs as the target RRUs in response to determining that the physical distance between every two of the at least two RRUs is greater than a first preset value, a signal strength of the uplink positioning signal received by each of the at least two RRUs is greater than a second preset value, and a channel correlation coefficient between channel state information of every two of the at least two RRUs is less than a third preset value; and
  - respectively obtain signal angles of arrival corresponding to the target RRUs, and determine a location of the to-be-positioned terminal according to the signal angles of arrival, locations of the target RRUs, and a preset algorithm.

8. The baseband unit according to claim 7, wherein the one or more hardware processors execute the instructions to:
- calculate the signal angles of arrival corresponding to the target RRUs according to the following manner:

$$\alpha = ar\cos((\lambda\theta)/(2\pi d)),$$

wherein $\alpha$ represents the signal angles of arrival corresponding to the target RRUs, $\lambda$ represents a wavelength of a radio signal, $\theta$ represents a phase difference between signals received by adjacent antenna array elements, d represents a distance between the antenna array elements, and $\pi$ is a circumference ratio; and
- calculate the location of the to-be-positioned terminal according to the signal angles of arrival, the locations of the target RRUs, and the preset algorithm.

* * * * *